US012563228B2

(12) United States Patent
He

(10) Patent No.: US 12,563,228 B2
(45) Date of Patent: Feb. 24, 2026

(54) SUB-PICTURE BITSTREAM EXTRACTION AND REPOSITION

(71) Applicant: InterDigital VC Holdings, Inc., Wilmington, DE (US)

(72) Inventor: Yong He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 53 days.

(21) Appl. No.: 17/435,669

(22) PCT Filed: Mar. 11, 2020

(86) PCT No.: PCT/US2020/022070
§ 371 (c)(1),
(2) Date: Sep. 1, 2021

(87) PCT Pub. No.: WO2020/185878
PCT Pub. Date: Sep. 17, 2020

(65) Prior Publication Data
US 2022/0141488 A1 May 5, 2022

Related U.S. Application Data

(60) Provisional application No. 62/855,446, filed on May 31, 2019, provisional application No. 62/816,703, filed on Mar. 11, 2019.

(51) Int. Cl.
H04N 19/597 (2014.01)
H04N 19/172 (2014.01)
(Continued)

(52) U.S. Cl.
CPC ......... H04N 19/597 (2014.11); H04N 19/172 (2014.11); H04N 19/30 (2014.11); H04N 19/70 (2014.11)

(58) Field of Classification Search
CPC .... H04N 19/597; H04N 19/172; H04N 19/30; H04N 19/70; H04N 19/184
(Continued)

(56) References Cited

U.S. PATENT DOCUMENTS

| | | | | |
|---|---|---|---|---|
| 2004/0008766 A1* | 1/2004 | Wang | ..................... | H04N 19/46 375/E7.091 |
| 2006/0256851 A1* | 11/2006 | Wang | ............. | H04N 21/234327 375/E7.011 |

(Continued)

FOREIGN PATENT DOCUMENTS

| | | |
|---|---|---|
| CN | 101548548 A | 9/2009 |
| CN | 104067620 A | 9/2014 |

(Continued)

OTHER PUBLICATIONS

International Telecommunication Union, "High Efficiency Video Coding". Series H: Audiovisual and Multimedia System; Infrastructure of audiovisual services, Coding of moving video, ITU-T Recommendation H.264, Dec. 2016, 664 pages.
(Continued)

*Primary Examiner* — Tung T Vo
(74) *Attorney, Agent, or Firm* — Klintworth & Rozenblat LLP

(57) ABSTRACT

Systems and methods described herein employ a high-level syntax design that supports a sub-picture extraction and reposition process. An input video may be encoded into multiple representations, each representation may be represented as a layer. A layer picture may be partitioned into multiple sub-pictures. Each sub-picture may have its own tile partitioning, resolution, color format and bit depth. Each sub-picture is encoded independently from other sub-pictures of the same layer, but it may be inter-predicted from the corresponding sub-pictures from its dependent layers. Each sub-picture may refer to a sub-picture parameter set where
(Continued)

the sub-picture properties such as resolution and coordinate is signaled. Each sub-picture parameter set may refer to a PPS where the resolution of the entire picture is signaled.

16 Claims, 19 Drawing Sheets

(51) Int. Cl.
     *H04N 19/30*          (2014.01)
     *H04N 19/70*          (2014.01)
(58) Field of Classification Search
     USPC ..................................................... 375/240.12
     See application file for complete search history.

(56)                    References Cited

U.S. PATENT DOCUMENTS

| | | | | |
|---|---|---|---|---|
| 2008/0095228 A1 | 4/2008 | Hannuksela | | |
| 2013/0188709 A1 | 7/2013 | Deshpande | | |
| 2014/0086344 A1* | 3/2014 | Wang | ..................... | H04N 19/46 |
| | | | | 375/240.28 |
| 2015/0016547 A1* | 1/2015 | Tabatabai | ............... | H04N 19/70 |
| | | | | 375/240.26 |
| 2015/0063453 A1 | 3/2015 | Kang | | |
| 2015/0312580 A1* | 10/2015 | Hannuksela | ............ | G06F 9/268 |
| | | | | 375/240.02 |
| 2015/0365702 A1* | 12/2015 | Deshpande | ............ | H04N 19/30 |
| | | | | 375/240.25 |
| 2015/0381998 A1* | 12/2015 | Wang | ..................... | H04N 19/40 |
| | | | | 375/240.16 |
| 2016/0044324 A1* | 2/2016 | Deshpande | ............ | H04N 19/44 |
| | | | | 375/240.25 |
| 2016/0165247 A1* | 6/2016 | Deshpande | ............ | H04N 19/90 |
| | | | | 375/240.08 |
| 2016/0173887 A1* | 6/2016 | Deshpande | .......... | H04N 19/124 |
| | | | | 375/240.08 |
| 2016/0191926 A1* | 6/2016 | Deshpande | .......... | H04N 19/105 |
| | | | | 375/240.12 |
| 2016/0255373 A1* | 9/2016 | Deshpande | ............ | H04N 19/46 |
| | | | | 375/240.25 |
| 2016/0366428 A1* | 12/2016 | Deshpande | ............ | H04N 19/30 |
| 2017/0150160 A1* | 5/2017 | Deshpande | ............ | H04N 19/70 |
| 2019/0058895 A1* | 2/2019 | Deshpande | .......... | H04N 19/423 |
| 2020/0186833 A1* | 6/2020 | Oh | ........................ | H04N 19/172 |
| 2021/0021814 A1* | 1/2021 | Wang | .................. | H04N 19/436 |
| 2021/0337228 A1* | 10/2021 | Wang | .................. | H04N 19/188 |

FOREIGN PATENT DOCUMENTS

| | | |
|---|---|---|
| CN | 105874804 A | 8/2016 |
| CN | 106105210 A | 11/2016 |
| JP | 2016518763 A | 6/2016 |
| JP | 2016528804 A | 9/2016 |
| JP | 2017510100 A | 4/2017 |
| WO | 2015102959 A1 | 7/2015 |
| WO | 2020146665 A1 | 7/2020 |

OTHER PUBLICATIONS

International Search Report and Written Opinion of the International Searching Authority for PCT/US2020/022070 mailed Jun. 24, 2020, 9 pages.

International Telecommunication Union, "High Efficiency Video Coding". Series H: Audiovisual and Multimedia Systems; cc-Coding of Moving Video, Recommendation ITU-T H.265, Telecommunication Standardization Sector of ITU, Apr. 29, 2014, 640 pages.

International Preliminary Report on Patentability for PCT/US2020/022070 issued on Aug. 25, 2021, 6 pages.

Hannuksela, Miska M., et al. "AHG12: On grouping of tiles". Joint Video Experts Team (JVET) of ITU-T SG16 WP3 and ISO/IEC JTC 1/SC29/WG11, Document No. JVET-M0261, 13th Meeting: Marrakech, MA, Jan. 9-18, 2019 (11 pages).

Hannuksela, Miska M. "AHG12/AHG17: On merging of MCTSs for viewport-dependent streaming". Joint Video Experts Team (JVET) of ITU-T SG16 WP3 and ISO/IEC JTC 1/SC29/WG11, Document No. JVET-M0388, 13th Meeting: Marrakech, MA, Jan. 9-18, 2019 (5 pages).

Ramasubramonian, Adarsh K., et al. "MV-HEVC/SHVC HLS: Sub-DPB based DPB operations". Joint Collaborative Team on Video Coding (JCT-VC) of ITU-T SG 16 WP 3 and ISO/IEC JTC 1/SC 29/WG 11, Document No. JCTVC-O0217, 15th Meeting: Geneva, CH, Oct. 23-Nov. 1, 2013 (4 pages).

He, Yong, et al. "AHG12/AHG17: On Sub-picture parameter set". Joint Video Experts Team (JVET) of ITU-T SG 16 WP 3 and ISO/IEC JTC 1/SC 29/WG 11, Document No. JVET-N0099, 14th Meeting: Geneva, CH, Mar. 19-27, 2019 (7 pages).

Skupin, Robert, et al. "AHG12: conformance of temporally independent tile groups". Joint Video Experts Team (JVET) of ITU-T SG 16 WP 3 and ISO/IEC JTC 1/SC 29/WG 11, Document No. JVET-N0354, 14th Meeting: Geneva, CH, Mar. 19-27, 2019 (4 pages).

Wang, Ye-Kui, et al. "AHG12: Harmonized proposal for sub-picture-based coding for VVC". Joint Video Experts Team (JVET) of ITU-T SG 16 WP 3 and ISO/IEC JTC 1/SC 29/WG 11, Document No. JVET-N0826-v1, 14th Meeting: Geneva, CH, Mar. 19-27, 2019 (3 pages).

Skupin, Robert, et al. "AHG17: Subpicture level info for extraction and merging". Joint Video Experts Team (JVET) of ITU-T SG 16 WP 3 and ISO/IEC JTC 1/SC 29/WG 11, Document No. JVET-P0984-v3, 16th Meeting: Geneva, CH, Oct. 1-11, 2019 (5 pages).

"Draft Requirements for Immersive Media Access and Delivery". ISO/IEC JTC 1/SC 29/WG 11, Document No. N18357, Geneva, CH—Mar. 2019 (18 pages).

He, Yong, et al. "AHG12: On picture and sub-picture signaling". Joint Video Experts Team (JVET) of ITU-T SG 16 WP 3 and ISO/IEC JTC 1/SC 29/WG 11, Document No. JVET-O0182, 15th Meeting: Gothenburg, SE, Jul. 3-12, 2019 (6 pages).

He, Yong, et al. "AHG12: On picture and sub-picture signaling". Joint Video Experts Team (JVET) of ITU-T SG 16 WP 3 and ISO/IEC JTC 1/SC 29/WG 11, Document No. JVET-O0182r1, 15th Meeting: Gothenburg, SE, Jul. 3-12, 2019 (6 pages).

He, Yong, et al. "AHG12: On layer-based sub-picture extraction and reposition". Joint Video Experts Team (JVET) of Itu-T SG 16 WP 3 and ISO/IEC JTC 1/SC 29/WG 11, Document No. JVET-O0183, 15th Meeting: Gothenburg, SE, Jul. 3-12, 2019 (4 pages).

He, Yong, et al. "AHG12: On sub-picture info SEI message". Joint Video Experts Team (JVET) of ITU-T SG 16 WP 3 and ISO/IEC JTC 1/SC 29/WG 11, Document No. JVET-O0700, 15th Meeting: Gothenburg, SE, Jul. 3-12, 2019 (2 pages).

Wang, Y.K. et al., ISO/IEC JTC1/SC29/WG11 N18227-v1, "WD 4 of ISO/IEC 23090-2 OMAF 2nd Edition", Jan. 2019 (227 pages).

* cited by examiner

1702

ENCODE A VIDEO
USING A PLURALITY
OF SUB-PICTURES

1704

DETERMINE CONSTRAINTS
ON SYNTAX ELEMENTS IN
SUB-PICTURES

1706

SIGNAL LEVEL INFORMATION
CONVEYING THE CONSTRAINTS
FOR EACH SUB-PICTURE

SUB-PICTURE BITSTREAM EXTRACTION AND REPOSITION

CROSS-REFERENCE TO RELATED APPLICATIONS

The present application is a national stage application under 35 U.S.C. § 371 of International Application No. PCT/US2020/022070, entitled "SUB-PICTURE BIT-STREAM EXTRACTION AND REPOSITION," filed on Mar. 11, 2020, which claims benefit under 35 U.S.C. § 119 (e) from U.S. Provisional Patent Application Ser. No. 62/816,703, entitled "Sub-Picture Bitstream Extraction and Reposition," filed Mar. 11, 2019, and U.S. Provisional Patent Application Ser. No. 62/855,446, entitled "Sub-Picture Bit-stream Extraction and Reposition," filed May 31, 2019 both of which are hereby incorporated by reference in their entirety.

BACKGROUND

360° video is a rapidly growing new format emerging in the media industry. It is enabled by the growing availability of VR devices and able to provide the viewer a very new sense of presence. Compared to conventional rectilinear video (2D or 3D), 360° video poses a new and difficult set of engineering challenges on video processing and delivery. Enabling comfort and immersive user experience calls for high video quality and very low latency, while the large video size can be an impediment to delivery of 360° video with high quality.

Video coding standards specify a syntax to be followed for conveying video and related information in a bitstream. It may be desirable in some cases to use only a particular subset of the available syntax, for example to reduce complexity. Different subsets of the entire bitstream syntax are referred to as different "profiles." Even with the use of a particular profile, there can be a wide variation in the memory and processing power of video encoder and decoder devices. Although different videos may follow the syntax specified by a particular profile, those different videos may still require a large variation in the performance of encoders and decoders. The required performance may correlate strongly to certain values signaled in the bitstream, such as the size of the decoded pictures.

To address this issue, some video coding standards, specify "levels" within each profile. A "level" is a predefined set of constraints imposed on values that may be taken by syntax elements and variables signaled in the bitstream. Some of these constraints impose limits the on individual values; other constraints impose limits on arithmetic combinations of values. For example, a particular level may impose a limit on picture width multiplied by picture height multiplied by the number of pictures decoded per second.

In some standards, levels are specified together with "tiers." In general, a level specified for a lower tier is more constrained than a level specified for a higher tier. A tier serves as a category of level constraints imposed on values signaled in the bitstream. The level constraints are nested within a tier, such that a decoder capable of decoding a bitstream with a certain tier and level is expected to be capable of decoding all bitstreams that conform to the same tier, to the lower tier of that level, or to any level below it.

In some video coding standards, profile, tier, and level information is signaled in a syntax structure such as a "profile_tier_level( )" structure. For example, in HEVC, the "profile_tier_level( )" structure contains a "general_level_idc" element, which indicates the level to which a coded video sequence of the bitstream conforms.

SUMMARY

Embodiments described herein include methods that are used in video encoding and decoding (collectively "coding") and in the bitstream re-writing process.

In some embodiments, a method includes encoding, in a bitstream, a video including at least one picture comprising a plurality of sub-pictures; and signaling, in the bitstream, level information for each of the respective sub-pictures; wherein the level information indicates, for each sub-picture, a predefined set of constraints on values of syntax elements of the respective sub-picture.

Some embodiments further include signaling one or more of a tier or a profile for the respective sub-picture.

In some embodiments, at least one of the sub-pictures is a layered sub-picture encoded in the bitstream using a plurality of layers, and the level information is signaled in the bitstream for each of the layers.

In some embodiments, each of the sub-pictures is associated with a layer, and each sub-picture within a layer is encoded independently from other sub-pictures in the same layer.

In some embodiments, a method further includes signaling at least one output sub-picture set in the bitstream, wherein the output sub-picture set identifies at least a subset of the plurality of sub-pictures and includes the level information for each of the sub-pictures in the subset.

In some embodiments, a method further includes signaling at least one output sub-picture set in the bitstream, wherein the output sub-picture set identifies at least a subset of the plurality of sub-pictures and includes position offset information for each of the sub-pictures in the subset.

In some embodiments, a method further includes signaling at least one output sub-picture set in the bitstream, wherein the output sub-picture set identifies at least a subset of the plurality of sub-pictures and includes size information for each of the sub-pictures in the subset.

In some embodiments, the level information for the sub-pictures is signaled in a profile_tier_level( ) data structure.

In some embodiments, a method includes decoding, from the bitstream, level information for each of a plurality of respective sub-pictures, wherein the level information indicates, for each sub-picture, a predefined set of constraints on values of syntax elements of the respective sub-picture; and decoding a plurality of the sub-pictures from the bitstream according to the level information.

In some embodiments, a method further includes selecting an output sub-picture set of the sub-pictures based at least in part on the level information, wherein decoding a plurality of the sub-pictures comprises decoding the selected output sub-picture set.

In some embodiments, a method further includes decoding, for at least one of the sub-pictures, information indicating a tier for the respective sub-picture.

In some embodiments, a method further includes decoding, for at least one of the sub-pictures, information indicating a profile for the respective sub-picture.

In some embodiments, at least one of the sub-pictures is a layered sub-picture encoded in the bitstream using a plurality of layers, and the method further includes decoding the level information from the bitstream for at least one of the layers.

In some embodiments, each of the sub-pictures is associated with a layer, and at least one sub-picture within a layer is decoded independently from other sub-pictures in the same layer.

Some embodiments further include decoding at least one output sub-picture set from the bitstream, wherein the output sub-picture set identifies at least a subset of the plurality of sub-pictures and includes the level information for each of the sub-pictures in the subset.

Some embodiments further include composing at least one output frame from the decoded plurality of sub-pictures.

Some embodiments further include decoding at least one output sub-picture set from the bitstream, wherein the output sub-picture set identifies at least a subset of the plurality of sub-pictures and includes position offset information for each of the sub-pictures in the subset, and wherein the output frame is composed based on the position offset information.

Some embodiments further include decoding at least one output sub-picture set from the bitstream, wherein the output sub-picture set identifies at least a subset of the plurality of sub-pictures and includes size information for each of the sub-pictures in the subset, and wherein the output frame is composed based on the size information.

In some embodiments, the level information for the sub-pictures is decoded in a profile_tier_level( ) data structure.

In some embodiments, a signal includes: information encoding a video including at least one picture comprising a plurality of sub-pictures; and level information for each of the respective sub-pictures; wherein the level information indicates, for each sub-picture, a predefined set of constraints on values of syntax elements of the respective sub-picture. The signal may be stored on a computer-readable medium. The computer-readable medium may be a non-transitory medium.

In additional embodiments, encoder, decoder, and bitstream rewriting/extraction systems are provided to perform the methods described herein.

Some embodiments include a processor configured to perform any of the methods described herein. In some such embodiments, a computer-readable medium (e.g. a non-transitory medium) is provided that stores instructions operative to perform any of the methods described herein.

Some embodiments include a computer-readable medium (e.g. a non-transitory medium) storing a video encoded using one or more of the methods disclosed herein.

One or more of the present embodiments also provide a computer readable storage medium having stored thereon instructions for encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

EXAMPLE NETWORKS FOR IMPLEMENTATION OF THE EMBODIMENTS

Figure 1A:
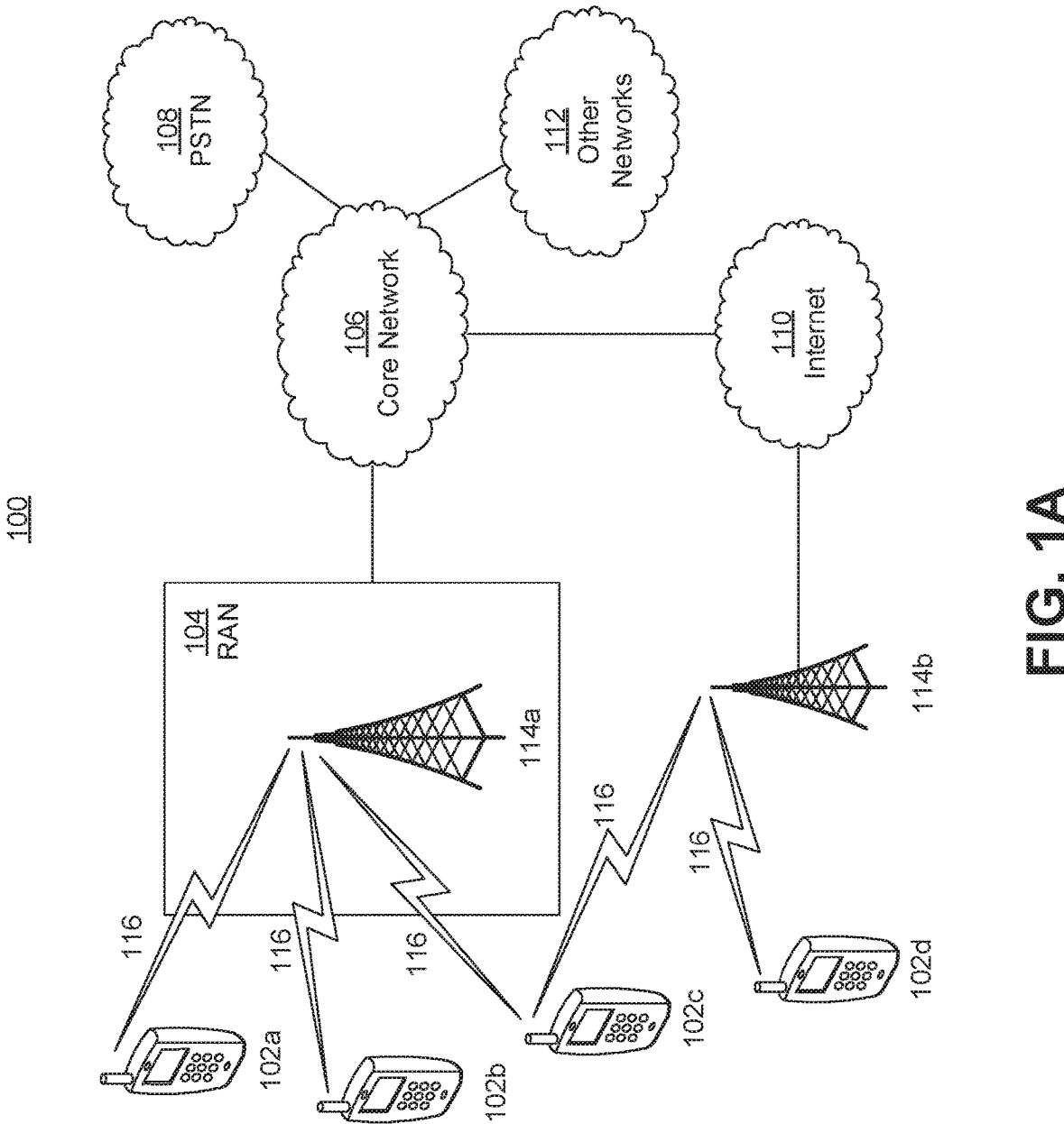
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile sub- scriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applica- tions (e.g., remote surgery), an industrial device and appli- cations (e.g., a robot and/or other wireless devices operating in an industrial and/or an automated processing chain con- texts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more com- munication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network ele- ments (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless commu- nication link (e.g., radio frequency (RF), microwave, cen- timeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technol- ogy such as Universal Mobile Telecommunications System (UMTS) Terrestrial Radio Access (UTRA), which may establish the air interface 116 using wideband CDMA (WCDMA). WCDMA may include communication proto- cols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evo- lution (LTE) and/or LTE-Advanced (LTE-A) and/or LTE- Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmis- sions sent to/from multiple types of base stations (e.g., a eNB and a gNB).

In other embodiments, the base station 114a and the WTRUs 102a, 102b, 102c may implement radio technolo- gies such as IEEE 802.11 (i.e., Wireless Fidelity (WiFi), IEEE 802.16 (i.e., Worldwide Interoperability for Micro- wave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput require- ments, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
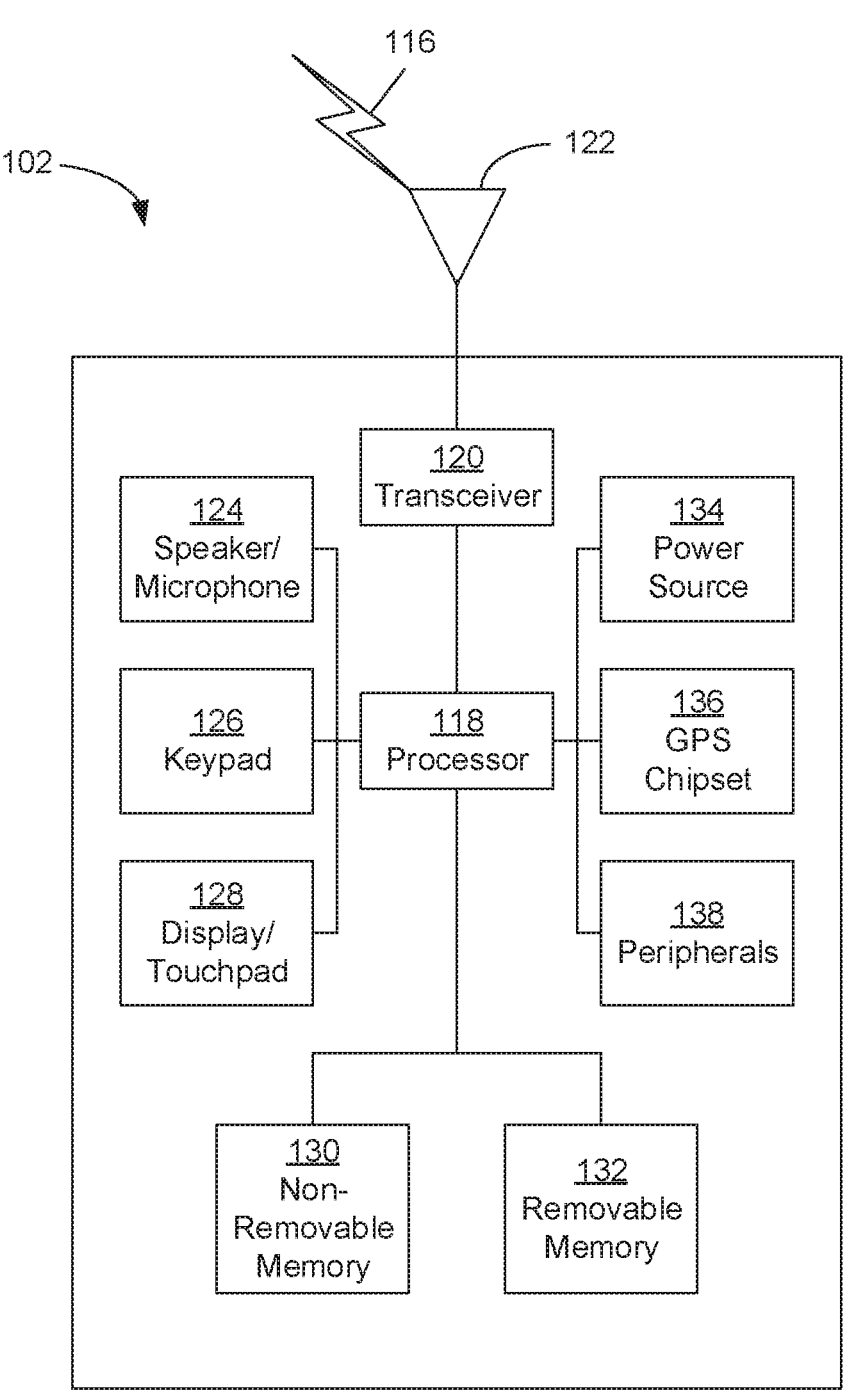
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Systems.

Figure 10:
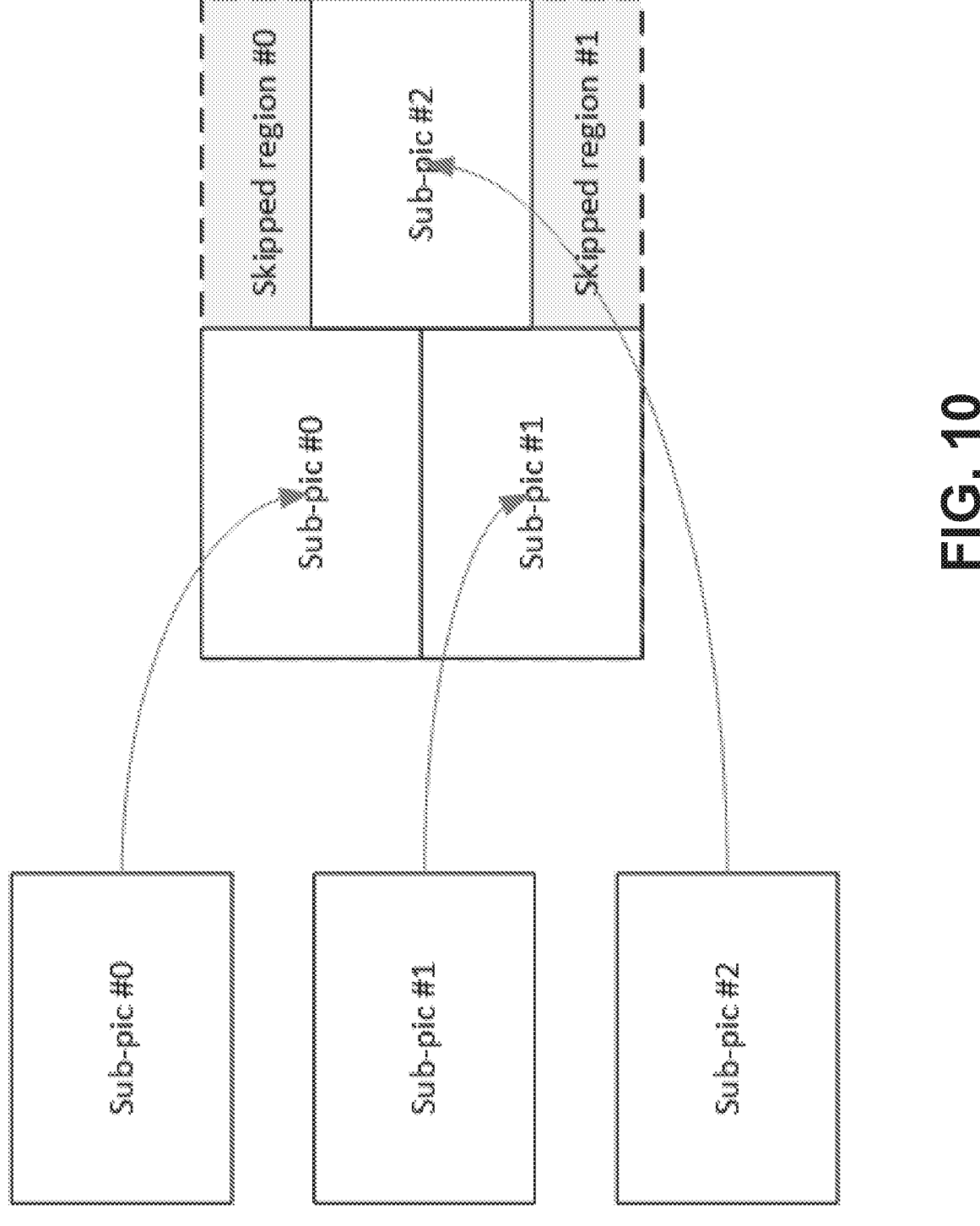
FIG. 10 illustrates an example of a skipped region of an output picture.

The embodiments described herein are not limited to being implemented on a WTRU. Such embodiments may be implemented using other systems, such as the system of FIG. 10. FIG. 10 is a block diagram of an example of a system in which various aspects and embodiments are implemented. System 2000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 2000, singly or in combination, can be embodied in a single integrated circuit (IC), multiple ICs, and/or discrete components. For example, in at least one embodiment, the processing and encoder/decoder elements of system 2000 are distributed across multiple ICs and/or discrete components. In various embodiments, the system 2000 is communicatively coupled to one or more other systems, or other electronic devices, via, for example, a communications bus or through dedicated input and/or output ports. In various embodiments, the system 2000 is configured to implement one or more of the aspects described in this document.

The system 2000 includes at least one processor 2010 configured to execute instructions loaded therein for implementing, for example, the various aspects described in this document. Processor 2010 can include embedded memory, input output interface, and various other circuitries as known in the art. The system 2000 includes at least one memory 2020 (e.g., a volatile memory device, and/or a non-volatile memory device). System 2000 includes a storage device 2040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 2040 can include an internal storage device, an attached storage device (including detachable and non-detachable storage devices), and/or a network accessible storage device, as non-limiting examples.

System 2000 includes an encoder/decoder module 2030 configured, for example, to process data to provide an encoded video or decoded video, and the encoder/decoder module 2030 can include its own processor and memory. The encoder/decoder module 2030 represents module(s) that can be included in a device to perform the encoding and/or decoding functions. As is known, a device can include one or both of the encoding and decoding modules. Additionally, encoder/decoder module 2030 can be implemented as a separate element of system 2000 or can be incorporated within processor 2010 as a combination of hardware and software as known to those skilled in the art.

Program code to be loaded onto processor 2010 or encoder/decoder 2030 to perform the various aspects described in this document can be stored in storage device 2040 and subsequently loaded onto memory 2020 for execution by processor 2010. In accordance with various embodiments, one or more of processor 2010, memory 2020, storage device 2040, and encoder/decoder module 2030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 2010 and/or the encoder/decoder module 2030 is used to store instructions and to provide working memory for processing that is needed during encoding or decoding. In other embodiments, however, a memory external to the processing device (for example, the processing device can be either the processor 2010 or the encoder/decoder module 2030) is used for one or more of these functions. The external memory can be the memory 2020 and/or the storage device 2040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

Figure 1C:
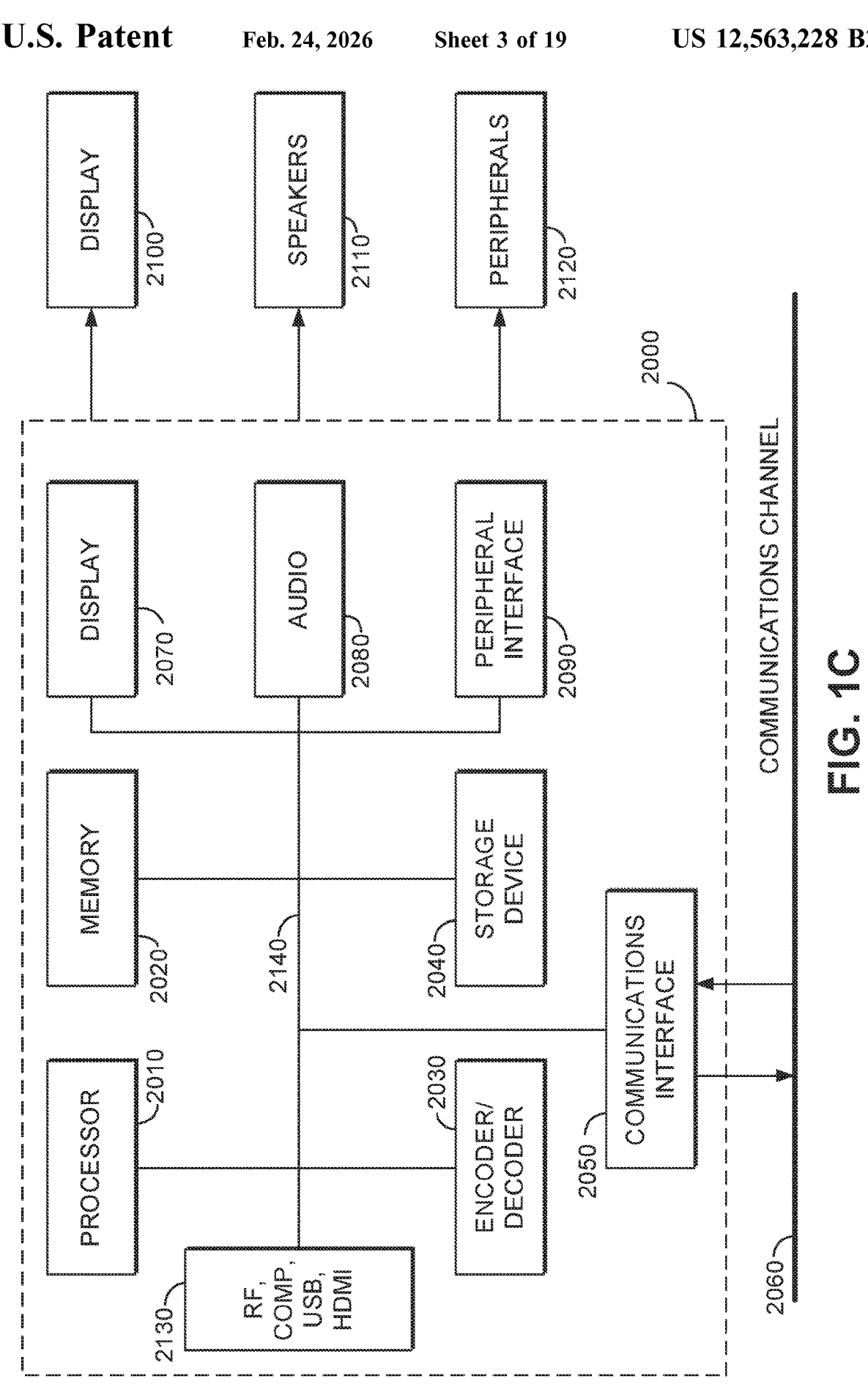
FIG. 1C is a functional block diagram of a system used in some embodiments described herein.

The input to the elements of system 2000 can be provided through various input devices as indicated in block 2130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 2130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 2000 to other electronic devices across USB and/or HDMI connections. It is to be understood that various aspects of input processing, for example, Reed-Solomon error correction, can be implemented, for example, within a separate input processing IC or within processor 2010 as necessary. Similarly, aspects of USB or HDMI interface processing can be implemented within separate interface ICs or within processor 2010 as necessary. The demodulated, error corrected, and demultiplexed stream is provided to various processing elements, including, for example, processor 2010, and encoder/decoder 2030 operating in combination with the memory and storage elements to process the datastream as necessary for presentation on an output device.

Various elements of system 2000 can be provided within an integrated housing, Within the integrated housing, the various elements can be interconnected and transmit data therebetween using suitable connection arrangement 2140, for example, an internal bus as known in the art, including the Inter-IC (I2C) bus, wiring, and printed circuit boards.

The system 2000 includes communication interface 2050 that enables communication with other devices via communication channel 2060. The communication interface 2050 can include, but is not limited to, a transceiver configured to transmit and to receive data over communication channel 2060. The communication interface 2050 can include, but is not limited to, a modem or network card and the communication channel 2060 can be implemented, for example, within a wired and/or a wireless medium.

Data is streamed, or otherwise provided, to the system 2000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 2060 and the communications interface 2050 which are adapted for Wi-Fi communications. The communications channel 2060 of these embodiments is typically connected to an access point or router that provides access to external networks including the Internet for allowing streaming applications and other over-the-top communications. Other embodiments provide streamed data to the system 2000 using a set-top box that delivers the data over the HDMI connection of the input block 2130. Still other embodiments provide streamed data to the system 2000 using the RF connection of the input block 2130. As indicated above, various embodiments provide data in a non-streaming manner. Additionally, various embodiments use wireless networks other than Wi-Fi, for example a cellular network or a Bluetooth network.

The system 2000 can provide an output signal to various output devices, including a display 2100, speakers 2110, and other peripheral devices 2120. The display 2100 of various embodiments includes one or more of, for example, a touchscreen display, an organic light-emitting diode (OLED) display, a curved display, and/or a foldable display. The display 2100 can be for a television, a tablet, a laptop, a cell phone (mobile phone), or other device. The display 2100 can also be integrated with other components (for example, as in a smart phone), or separate (for example, an external monitor for a laptop). The other peripheral devices 2120 include, in various examples of embodiments, one or more of a stand-alone digital video disc (or digital versatile disc) (DVR, for both terms), a disk player, a stereo system, and/or a lighting system. Various embodiments use one or more peripheral devices 2120 that provide a function based on the output of the system 2000. For example, a disk player performs the function of playing the output of the system 2000.

In various embodiments, control signals are communicated between the system 2000 and the display 2100, speakers 2110, or other peripheral devices 2120 using signaling such as AV.Link, Consumer Electronics Control (CEC), or other communications protocols that enable device-to-device control with or without user intervention. The output devices can be communicatively coupled to system 2000 via dedicated connections through respective interfaces 2070, 2080, and 2090. Alternatively, the output devices can be connected to system 2000 using the communications channel 2060 via the communications interface 2050. The display 2100 and speakers 2110 can be integrated in a single unit with the other components of system 2000 in an electronic device such as, for example, a television. In various embodiments, the display interface 2070 includes a display driver, such as, for example, a timing controller (T Con) chip.

The display 2100 and speaker 2110 can alternatively be separate from one or more of the other components, for example, if the RF portion of input 2130 is part of a separate set-top box. In various embodiments in which the display 2100 and speakers 2110 are external components, the output signal can be provided via dedicated output connections, including, for example, HDMI ports, USB ports, or COMP outputs.

The embodiments can be carried out by computer software implemented by the processor 2010 or by hardware, or by a combination of hardware and software. As a non-limiting example, the embodiments can be implemented by one or more integrated circuits. The memory 2020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 2010 can be of any type appropriate to the technical environment, and can encompass one or more of microprocessors, general purpose computers, special purpose computers, and processors based on a multi-core architecture, as non-limiting examples.

DETAILED DESCRIPTION

Block-Based Video Coding.

Figure 2A:
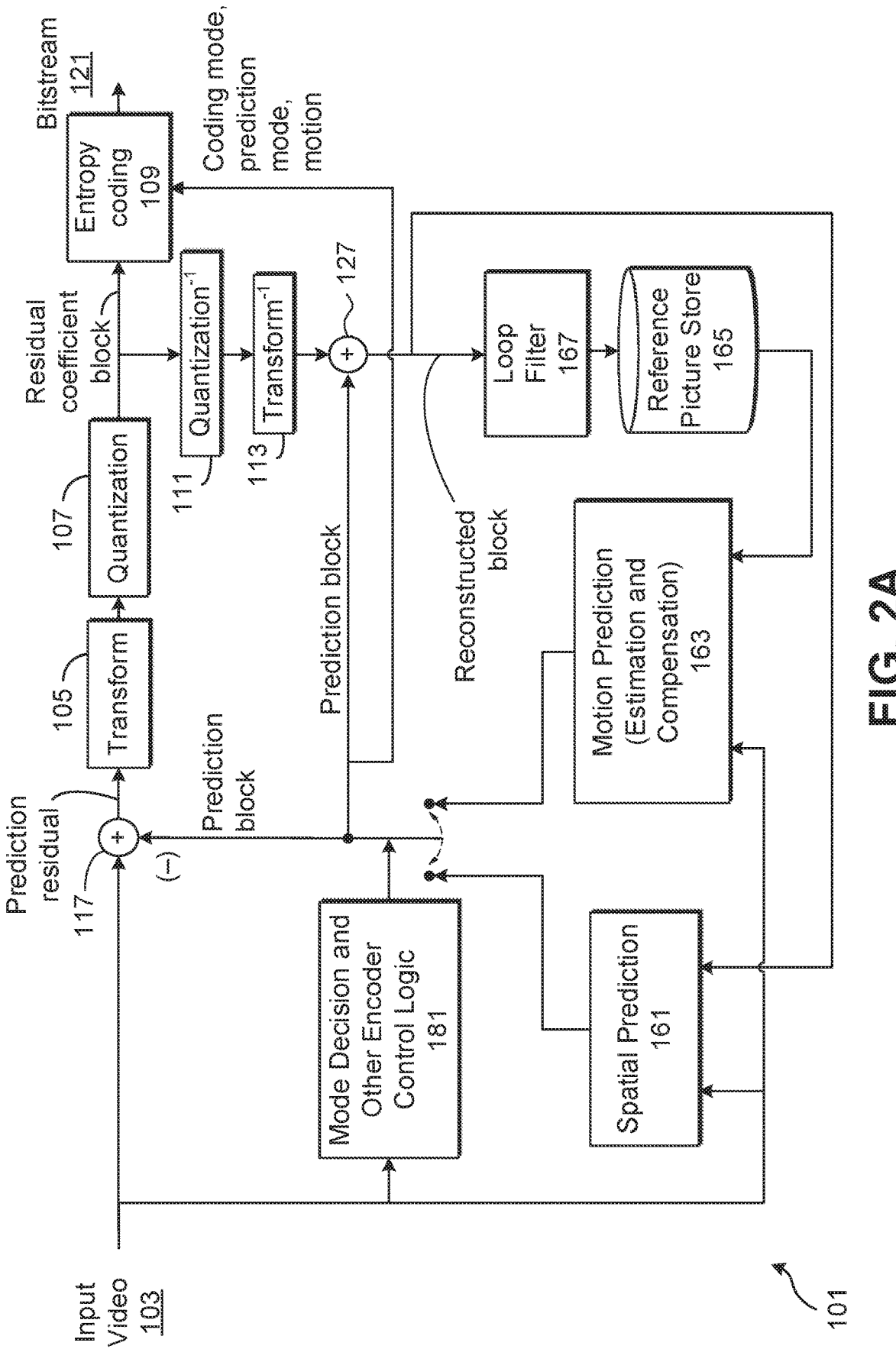
FIG. 2A is a functional block diagram of block-based video encoder, such as an encoder used for VVC.

Like HEVC, the VVC is built upon the block-based hybrid video coding framework. FIG. 2A gives the block diagram of a generic block-based hybrid video encoding system. The input video signal 103 is processed block by block. In HEVC, extended block sizes (called a "coding unit" or CU) are used to efficiently compress high resolution (1080p and beyond) video signals. In HEVC, a CU can be up to 64×64 pixels. A CU can be further partitioned into prediction units or PU, for which separate prediction methods are applied. For each input video block (MB or CU), spatial prediction (161) and/or temporal prediction (163) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures to predict the current video block. Temporal prediction reduces temporal redundancy inherent in the video signal. Temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally; and the reference index is used to identify from which reference picture in the reference picture store (165) the temporal prediction signal comes. After spatial and/or temporal prediction, the mode decision block (181) in the encoder chooses the best prediction mode, for example based on the rate-distortion optimization method. The prediction block is then subtracted from the current video block (117); and the prediction residual is de-correlated using transform (105) and quantized (107) to achieve the target bit-rate. The quantized residual coefficients are inverse quantized (111) and inverse transformed (113) to form the reconstructed residual, which is then added back to the prediction block (127) to form the reconstructed video block. Further in-loop filtering such as de-blocking filter and Adaptive Loop Filters may be applied (167) on the reconstructed video block before it is put in the reference picture store (165) and used to code future video blocks. To form the output video bit-stream 121, coding mode (inter or intra), prediction mode information, motion information, and quantized residual coefficients are all sent to the entropy coding unit (109) to be further compressed and packed to form the bit-stream.

Figure 2B:
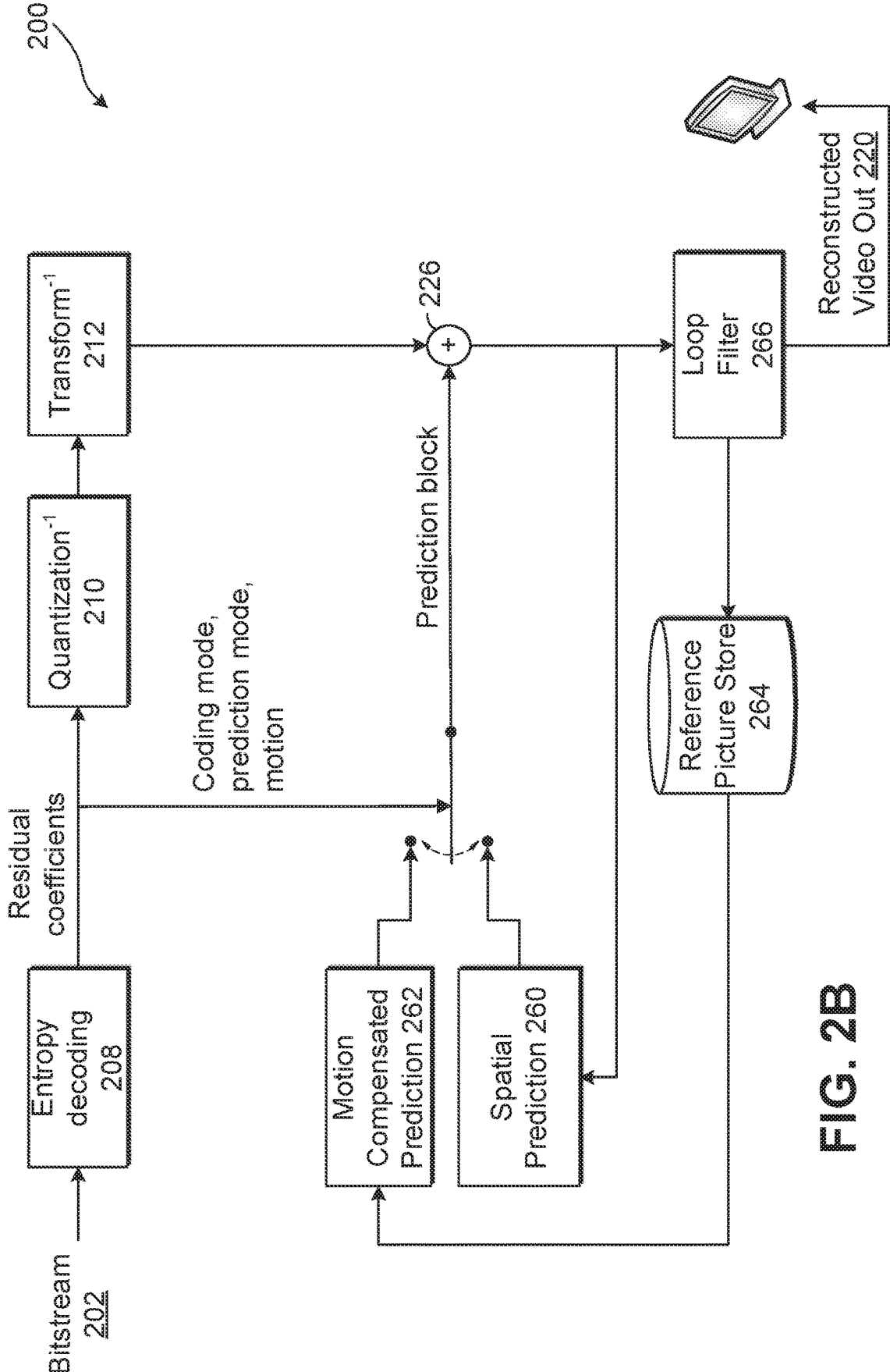
FIG. 2B is a functional block diagram of a block-based video decoder, such as a decoder used for VVC.

FIG. 2B gives a block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

In modern video codecs, bi-directional motion compensated prediction (MCP) is known for its high efficiency in removing temporal redundancy by exploiting temporal correlations between pictures, and has been widely adopted in most of the state-of-the-art video codecs. However, the bi-prediction signal is formed simply by combining two uni-prediction signals using a weight value equal to 0.5. This is not necessarily optimal to combine the uni-prediction signals, especially in cases where illuminance changes rapidly in from one reference picture to another. Thus, several prediction techniques aim at compensating the illuminance variation over time by applying some global or local weights and offset values to each of the sample values in reference pictures.

Scalable Video Coding.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, multiple layer video coding technologies, such as scalable video coding and/or multi-view video coding, may be designed to handle more than one video layer where each layer may be decoded to reconstruct a video signal of a particular spatial resolution, temporal resolution, fidelity, and/or view. Although a single layer encoder and decoder are described with reference to FIG. 2A and FIG. 2B, the concepts described herein may utilize a multiple layer encoder and/or decoder, for example, for multi-view and/or scalable coding technologies.

Scalable video coding may improve the quality of experience for video applications running on devices with different capabilities over heterogeneous networks. Scalable video coding may encode the signal once at a highest representation (e.g., temporal resolution, spatial resolution, quality, etc.), but enable decoding from subsets of the video streams depending on the specific rate and representation required by certain applications running on a client device. Scalable video coding may save bandwidth and/or storage compared to non-scalable solutions. The international video standards, e.g., MPEG-2 Video, H.263, MPEG4 Visual, H.264, etc., may have tools and/or profiles that support modes of scalability.

Table 1 provides an example of different types of scalabilities along with the corresponding standards that may support them. Bit-depth scalability and/or chroma format scalability may be tied to video formats (e.g., higher than 8-bit video, and chroma sampling formats higher than YUV4:2:0), for example, which may primarily be used by professional video applications. Aspect ratio scalability may be provided.

VQM, visual quality, etc.), 3D capability (e.g., with two or more views), luma and chroma bit depth, chroma format, and underlying single-layer coding standard. Different use cases may use different types of scalability, for example, as illustrated in Table 1. A scalable coding architecture may offer a common structure that may be configured to support one or more scalabilities (e.g., the scalabilities listed in Table 1). A scalable coding architecture may be flexible to support different scalabilities with minimum configuration efforts. A scalable coding architecture may include at least one preferred operating mode that may not require changes to block level operations, such that the coding logics (e.g., encoding and/or decoding logics) may be maximally reused within the scalable coding system. For example, a scalable coding architecture based on a picture level inter-layer processing and management unit may be provided, wherein the inter-layer prediction may be performed at the picture level.

Figure 3:
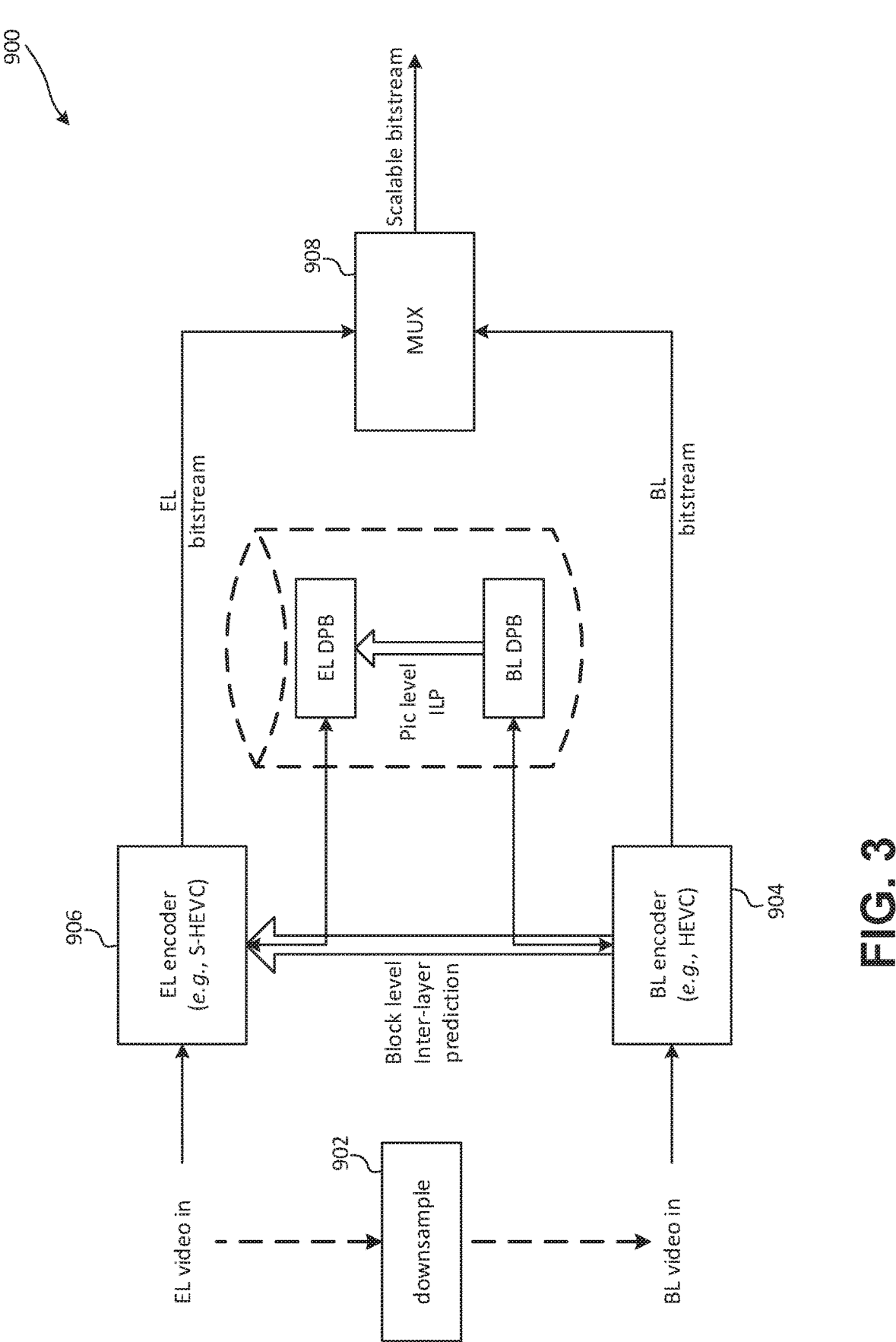
FIG. 3 is a diagram of example architecture of a two-layer scalable video encoder.

FIG. 3 is a diagram of example architecture of a two-layer scalable video encoder. The video encoder 900 may receive video (e.g., an enhancement layer video input). An enhancement layer video may be down-sampled using a down sampler 902 to create lower level video inputs (e.g., the base layer video input). The enhancement layer video input and the base layer video input may correspond to each other via the down-sampling process and may achieve spatial scalability. The base layer encoder 904 (e.g., an HEVC encoder in this example) may encode the base layer video input block by block and generate a base layer bitstream. FIG. 2A is a diagram of an example block-based single layer video encoder that may be used as the base layer encoder in FIG. 3.

At the enhancement layer, the enhancement layer (EL) encoder 906 may receive the EL input video input, which may be of higher spatial resolution (e.g., and/or higher values of other video parameters) than the base layer video input. The EL encoder 906 may produce an EL bitstream in a substantially similar manner as the base layer video encoder 904, for example, using spatial and/or temporal predictions to achieve compression. Inter-layer prediction (ILP) may be available at the EL encoder 906 to improve its coding performance. Unlike spatial and temporal predictions that may derive the prediction signal based on coded video signals in the current enhancement layer, inter-layer prediction may derive the prediction signal based on coded video

TABLE 1

| Scalability | Example | Standards |
|---|---|---|
| View scalability | 2D→3D (2 or more views) | MVC, MFC, 3DV |
| Spatial scalability | 720p→1080p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC |
| Chroma format scalability | YUV4:2:0→YUV4:2:2, YUV4:4:4 | Scalable HEVC |
| Color Gamut Scalability | BT.709 → BT.2020 | Scalable HEVC |
| Aspect ratio scalability | 4:3→16:9 | Scalable HEVC |

Scalable video coding may provide a first level of video quality associated with a first set of video parameters using the base layer bitstream. Scalable video coding may provide one or more levels of higher quality associated with one or more sets of enhanced parameters using one or more enhancement layer bitstreams. The set of video parameters may include one or more of spatial resolution, frame rate, reconstructed video quality (e.g., in the form of SNR, PSNR, signals from the base layer (e.g., and/or other lower layers when there are more than two layers in the scalable system). At least two forms of inter-layer prediction, picture-level ILP and block-level ILP, may be used in the scalable system. Picture-level ILP and block-level ILP are discussed herein. A bitstream multiplexer 908 may combine the base layer and enhancement layer bitstreams together to produce a scalable bitstream.

Figure 4:
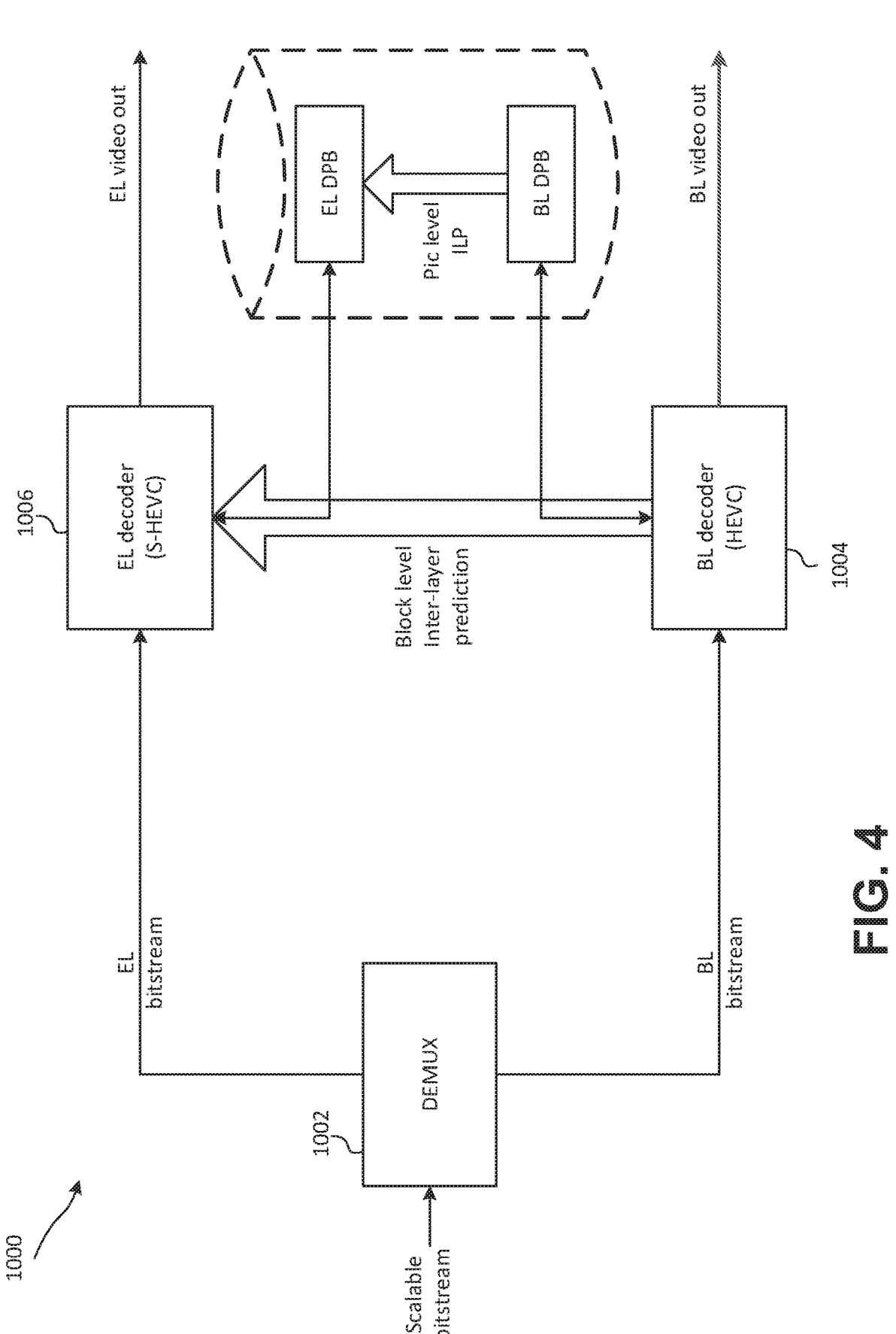
FIG. 4 is a diagram of example architecture of a two-layer scalable video decoder.

FIG. 4 is a diagram of example architecture of a two-layer scalable video decoder. The two-layer scalable video decoder architecture of FIG. 4 may correspond to the scalable encoder in FIG. 3. The video decoder 1000 may receive a scalable bitstream, for example, from a scalable encoder (e.g., the scalable encoder 900). The de-multiplexer 1002 may separate the scalable bitstream into a base layer bitstream and an enhancement layer bitstream. The base layer decoder 1004 may decode the base layer bitstream and may reconstruct the base layer video. FIG. 2B is a diagram of an example block-based single layer video decoder that may be used as the base layer decoder in FIG. 4.

The enhancement layer decoder 1006 may decode the enhancement layer bitstream. The EL decoder 1006 may decode the EL bitstream in a substantially similar manner as the base layer video decoder 1004. The enhancement layer decoder may do so using information from the current layer and/or information from one or more dependent layers (e.g., the base layer). For example, such information from one or more dependent layers may go through inter layer processing, which may be accomplished when picture-level ILP and/or block-level ILP are used. Although not shown, additional ILP information may be multiplexed together with base and enhancement layer bitstreams at the MUX 908. The ILP information may be de-multiplexed by the DEMUX 1002.

Figure 5:
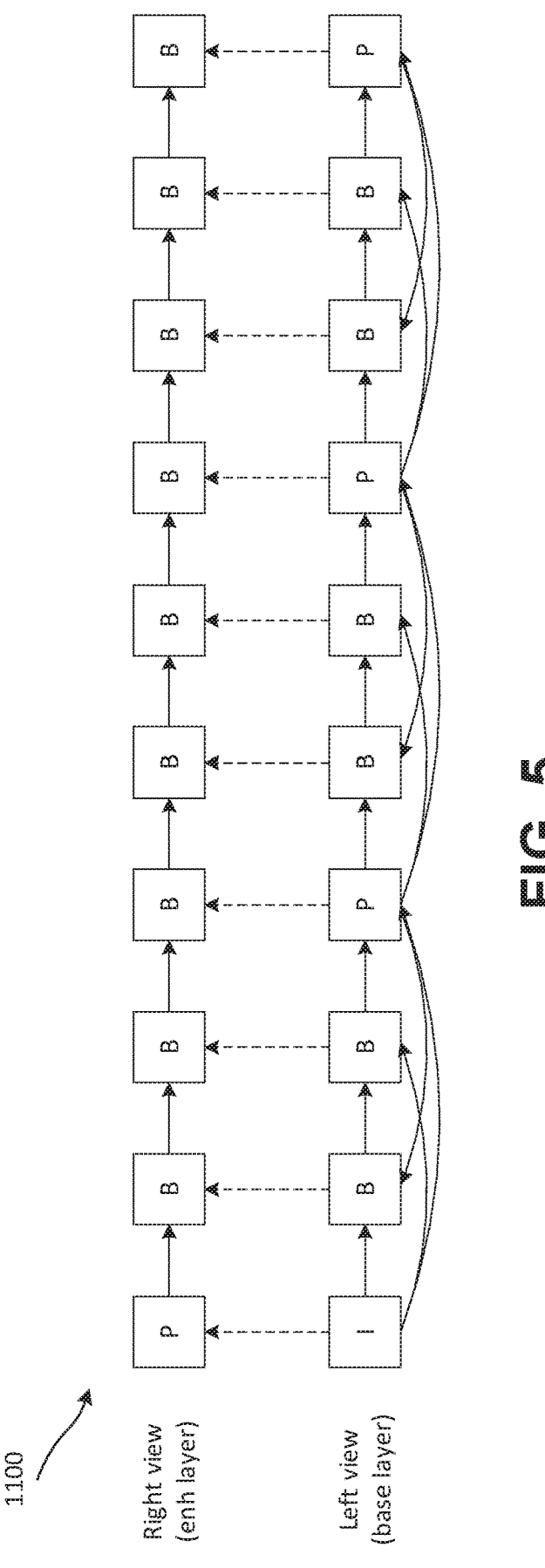
FIG. 5 is a diagram illustrating an example of a two view video coding structure.

FIG. 5 is a diagram illustrating an example of a two view video coding structure. As shown generally at 1100, FIG. 5 illustrates an example of temporal and inter-dimension/layer prediction for two-view video coding. Besides general temporal prediction, the inter-layer prediction (e.g., exemplified by dashed lines) may be used to improve the compression efficiency by exploring the correlation among multiple video layers. In this example, the inter-layer prediction may be performed between two views.

Inter-layer prediction may be employed in an HEVC scalable coding extension, for example, to explore the strong correlation among multiple layers and/or to improve scalable coding efficiency.

Figure 6:
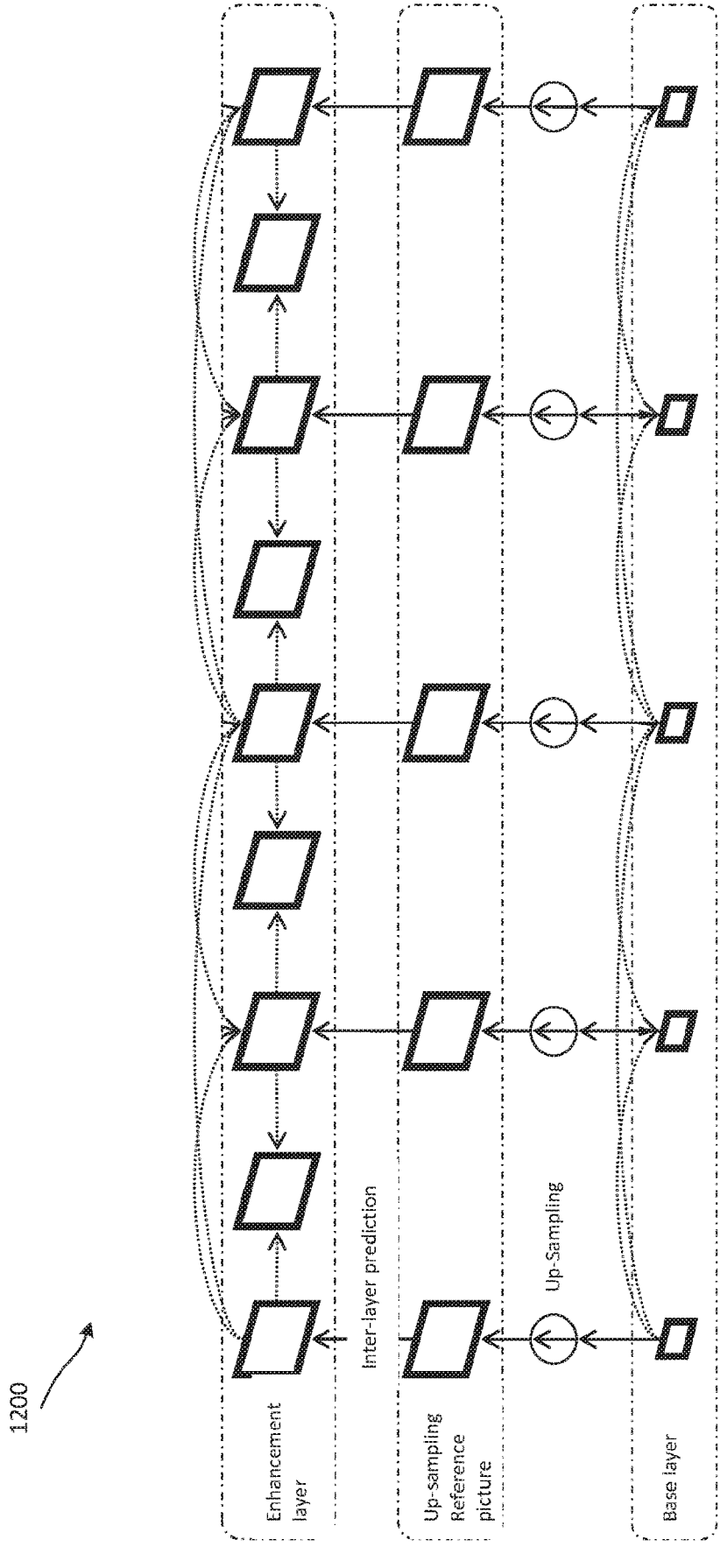
FIG. 6 is a diagram illustrating an example inter-layer prediction structure.

FIG. 6 is a diagram illustrating an example inter-layer prediction structure, for example, which may be considered for an HEVC scalable coding system. As shown generally at 1200, the prediction of an enhancement layer may be formed by motion-compensated prediction from the reconstructed base layer signal (e.g., after up-sampling if the spatial resolutions between the two layers are different), by temporal prediction within the current enhancement layer, and/or by averaging a base layer reconstruction signal with a temporal prediction signal. Full reconstruction of the lower layer pictures may be performed. Similar concepts may be utilized for HEVC scalable coding with more than two layers.

Coded Bitstream Structure.

Figure 7:
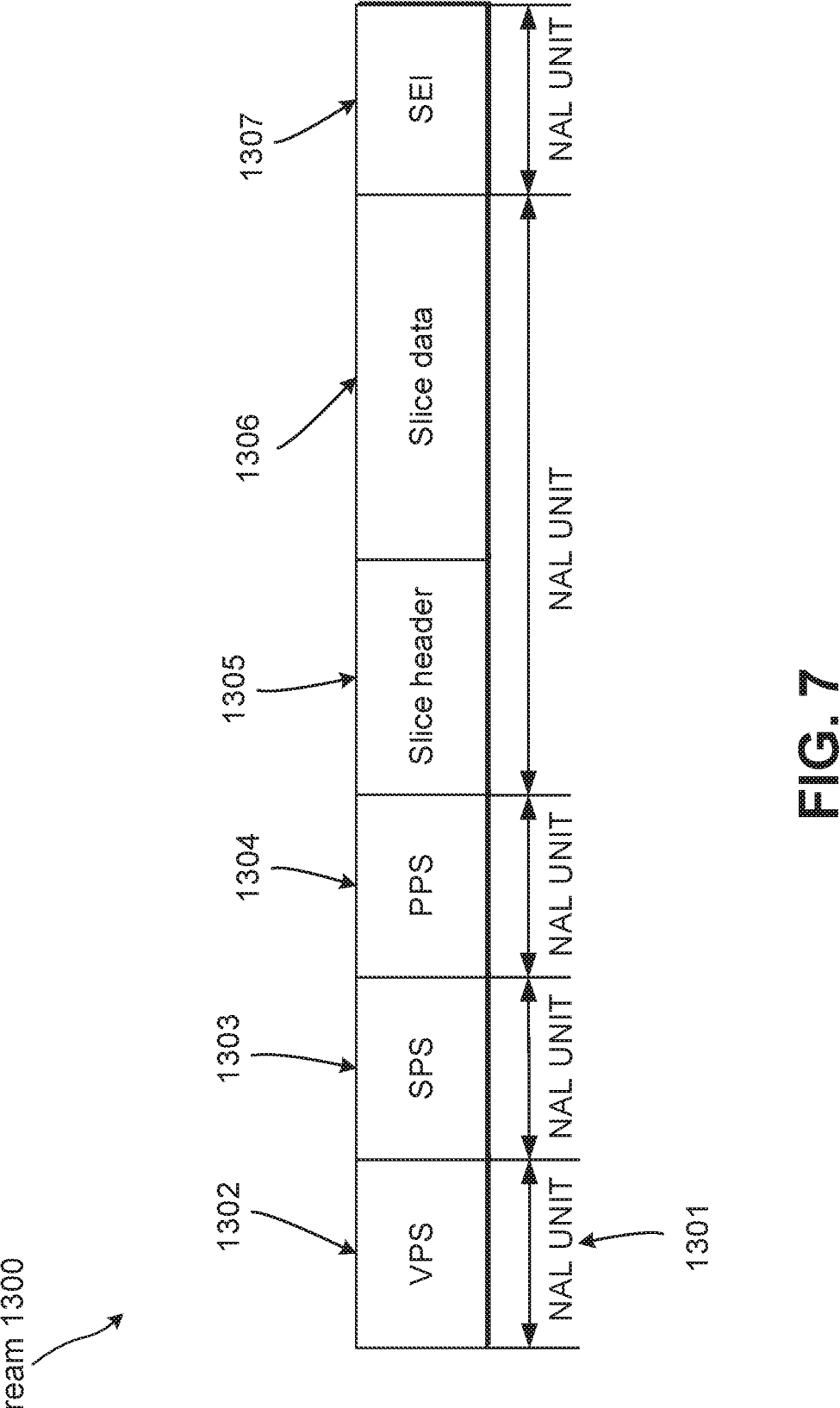
FIG. 7 is a diagram illustrating an example of a coded bitstream structure.

FIG. 7 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 8:
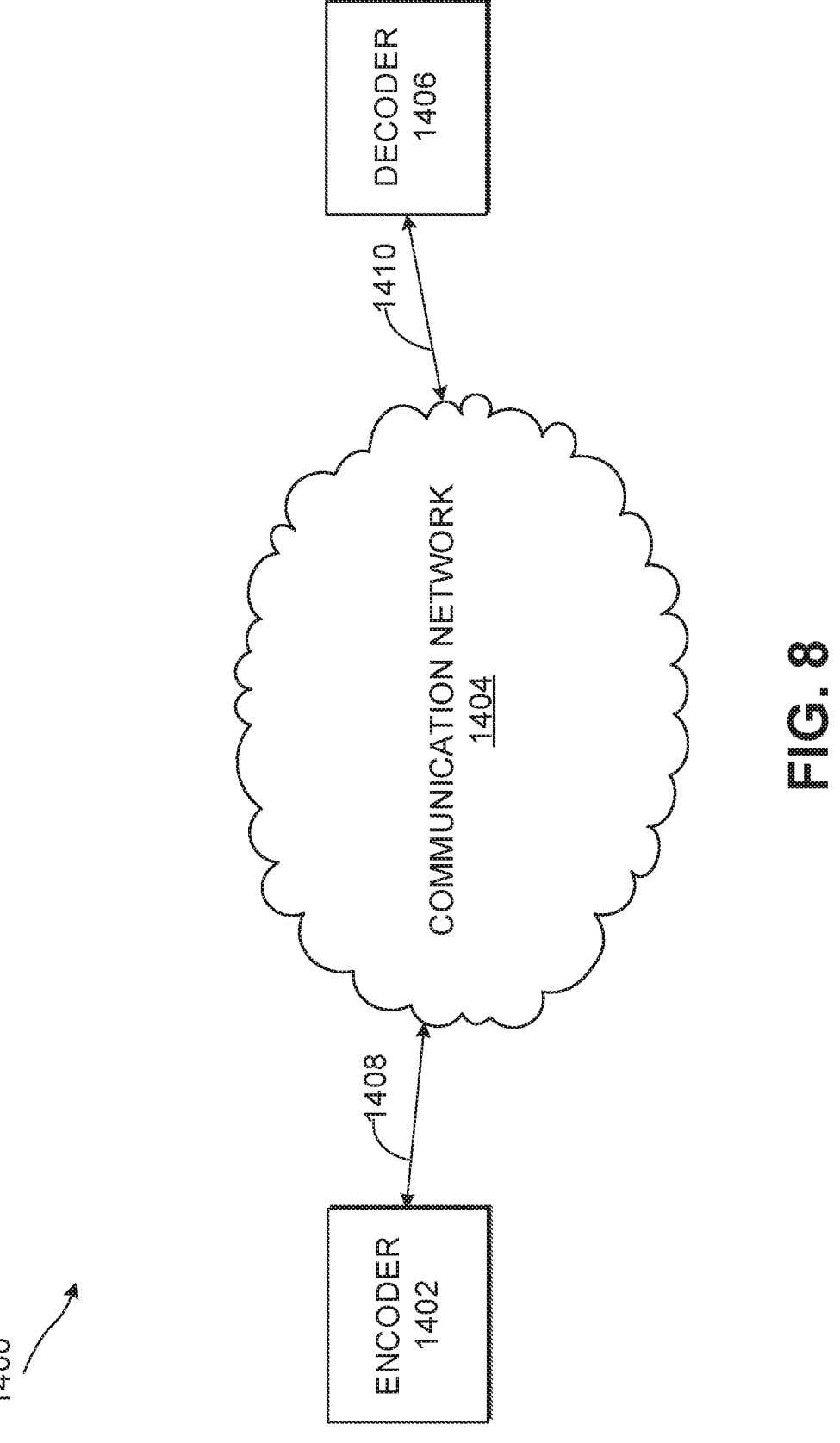
FIG. 8 is a diagram illustrating an example communication system.

FIG. 8 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Sub-Pictures.

A sub-picture is a picture that represents a spatial subset of the original video content, which has been split into spatial subsets before video encoding at the content production side. The sub-picture bitstream is the encoded version of one or more representations which contain the sub-pictures. (The terms sub-picture and sub-picture bitstream may be used interchangeably in this context.)

Figure 9:
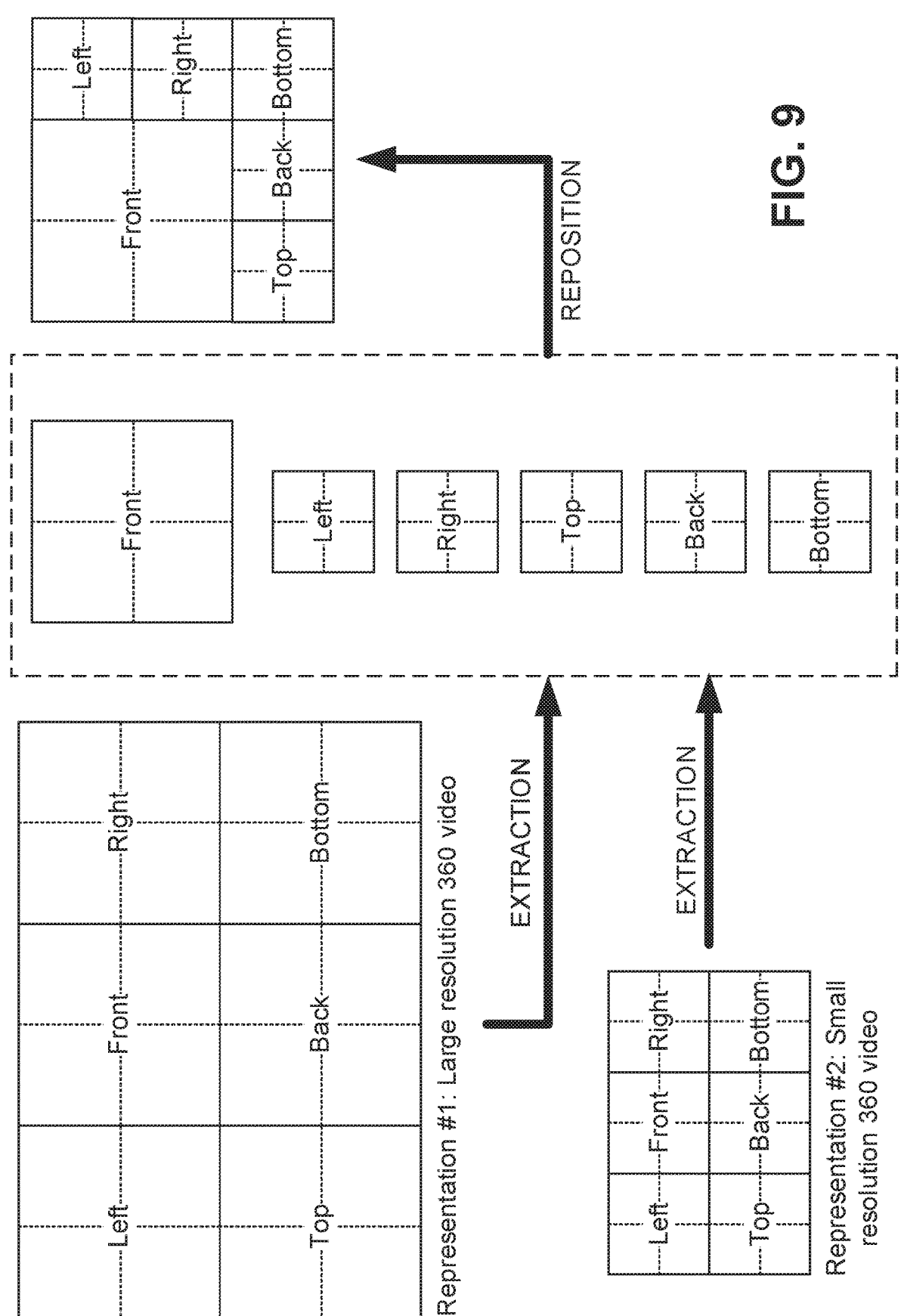
FIG. 9 illustrates a 360 video viewport adaptive streaming example.

Sub-pictures can be used in region-of-interest (ROI) applications or omnidirectional video for viewport adaptive streaming. FIG. 9 illustrates an example of viewport adaptive streaming. In this example, the sub-pictures may represent faces of a cubemap projection format, for example. The content is encoded at two spatial resolutions. In both resolutions a 3×2 sub-picture grid is used, and each sub-picture is encoded independently from other sub-pictures. Each coded sub-picture sequence is stored as a sub-picture bitstream which results in twelve sub-picture bitstreams being available for extraction. Depending on a user's viewing orientation, a different combination of high and low resolution sub-pictures may be extracted and then re-packaged for delivery to the users 360 video streaming client. For example, if the user's orientation is well aligned with the Front sub-picture content, then a high-resolution Front sub-picture (e.g. front view) may be extracted along with various other low-resolution sub-pictures (e.g. left, right, top, back and bottom views). The extracted sub-pictures may then be repositioned to form an output bitstream to deliver high-resolution viewport to the user with an overall reduced bitrate.

Sub-Bitstreams.

A sub-bitstream extraction process is specified in HEVC as a specified process by which NAL units in a bitstream that do not belong to a target set, determined by a target highest TemporalID and a target layer identifier list, are removed from the bitstream, with the output sub-bitstream consisting of the NAL units in the bitstream that belong to the target set. The inputs to sub-bitstream extraction process are a bitstream, a target highest TemporalID value and a target layer identifier list, the output of such process is a sub-bitstream.

In a sub-picture extraction and reposition process, the sub-bitstream is not only extracted from one bitstream but also repositioned into another bitstream to form an output bitstream.

Issues Addressed in Some Embodiments.

Sub-picture related proposals were reviewed in the 13$^{th}$ JVET meeting to enable flexible tiling and independently decodable rectangular region(s). It was proposed in JVET-M0261, "On grouping of tiles", January 2019, that a sub-picture may refer to its own PPSs with sub-picture size signaling and that a sub-picture may be treated like a picture in the decoding process, for example, treating sub-picture boundaries as picture boundaries using padding. It was proposed in JVET-M0388, "On merging of MCTSs for viewport dependent streaming", January 2019 that sub-pictures of the same coded picture may have different NAL unit type values to accommodate different IRAP (intra random access point) distance of each representation. The sub-picture may also be treated as a motion constrained tile set (MCTS) as HEVC specified using an SEI message.

Disclosed herein are systems and methods for decoder buffer management, picture order count (POC) value synchronization, use of a sub-picture parameter set to facilitate the sub-picture-based extraction and reposition process, and other operations.

As described in JVET-N0826, sub-picture-based coding may be implemented in VVC. A picture may be divided into sub-pictures, and each sub-picture may refer its own PPS with its own tile partitioning. The position and size of each sub-picture is indicated in the SPS. The SPS also specifies one or multiple output sub-picture sets. Each output sub-picture set may include multiple sub-pictures to form an output picture with specific resolution, profile, tier and level. However, the output sub-picture set according to such a system only applies the sub-pictures that refer to the same SPS. In contrast, it may be desirable when using viewport-dependent streaming to compose different sub-pictures from different resolution pictures that refer to different SPSs. In addition, an SPS may not be shared across multiple layers if only one layout configuration of sub-pictures is signaled in an SPS.

For immersive media access and delivery, it is desirable to use a generalized system decoder model for new applications. New media applications may consist of multiple components, and the rendering of media data operates to decode all or a subset of the component data. Each component data may be encoded by a different media codec, and multiple scalable version of the same component content (such as spatial coding resolution, coding quality and temporal coding rate) may be available for adaptive access and delivery. For example, video based point cloud compression (VPCC) projects point cloud data to geometry, texture, occupancy map and patch components; each video component data may be encoded by AVC, HEVC or VVC encoder, and point cloud data can be reconstructed by combining all or partial decoded video component data and the timed metadata. 3DoF+ visual coding provides multiple base views and additional views data with the metadata to facilitate view synthesis and render at the client side. These multi-stream scenarios are traditionally handled by system specification such as file format and streaming protocol to address the access, delivery and presentation synchronization. New decoding model and NAL unit design may be required for video coding standard to handle multi-stream scenario.

The layer concept without inter-layer prediction is adopted as a starting point to support immersive media access and delivery in VVC, as the layer structure can support multi-stream straightforwardly. For a sub-picture scenario, each sub-picture may be represented as an independent picture of a specific layer; a sub-picture may represent a patch or a group of patches for VPCC data. The output picture may be a composite picture of multiple sub-pictures from different layers. However, adequate signaling has not previously been developed to indicate content and spatial correlation among sub-pictures from different layers.

Overview of Some Embodiments.

Example systems and methods described herein employ a high-level syntax design that supports a sub-picture extraction and reposition process. An input video may be encoded into multiple representations, each representation may be represented as a layer. A layer picture may be partitioned into multiple sub-pictures. Each sub-picture may have its own tile partitioning, resolution, color format and bit depth. Each sub-picture is encoded independently from other sub-pictures of the same layer, but it may be inter-predicted from the corresponding sub-pictures from its dependent layers. Each sub-picture may refer to a sub-picture parameter set where the sub-picture properties such as resolution and coordinate is signaled. Each sub-picture parameter set may refer to a PPS where the resolution of the entire picture is signaled.

The POC value of each sub-picture NAL unit within the associated picture is preferably consistent, and the NAL unit type may be different with an access unit. A POC reset method is used to ensure IDR NAL unit and non-IDR NAL unit share the same POC value.

The DPB is partitioned into multiple sub-DPBs, each sub-DPB is associated with a sub-picture. The maximum sub-DPB size and reordered picture number may be signaled for each sub-picture for session negotiation.

The output sub-picture set is used to indicate the sub-pictures to be extracted and repositioned for an output picture. The sub-picture extraction process removes all NAL units whose sub-picture identifier or tile group ID not included in the output sub-picture set and removes all NAL units whose temporal ID is greater than the target temporal ID.

After repositioning the sub-pictures for an output picture, each sub-picture parameter set may refer to a new PPS associated with the output picture. The POC value of each sub-picture may be derived based on the POC anchor picture of the new output sequence. The constraints are proposed to enable adaptive resolution change (ARC) and enable the corresponding reference pictures to be available in DPB. During ARC, the reference pictures of a previous sub-picture may be scaled and transformed to match the ARC sub-picture switched to. The scaled and transformed reference pictures are placed in the sub-DPB associated with the new sub-picture, and the sub-DPB associated with the previous sub-picture is freed. The size of each sub-picture of output picture may change, and the size of the output picture may also change. The maximum output picture resolution, profile and level may be signaled in the output sub-picture set, or the output parameter set associated with the sub-picture extraction and reposition process.

The original video content may be encoded into multiple versions or representations in different resolution, depth, or color format. Each of these representations may be packed in a multi-layer structure. Each bitstream may be coded independently or inter-layer predicted from other layers. Each representation has its own layer ID and temporal ID. Since each sub-picture contains only one tile group, the tile group ID may be used as an identifier (e.g. a unique identifier) for the sub-picture. Described herein are output sub-picture set, sub-picture parameter set, and sub-DPB management, as will be further described in the subsections below.

Output Sub-Picture Set.

Scalable HEVC (SHVC) specifies the layer set to identify the set of layers represented within a bitstream created from another bitstream by operation of the sub-bitstream extraction process, as described in ISO/IEC DIS 23008-2:2018(E), "High Efficiency Video Coding".

In some embodiments, for a sub-picture extraction process, an output sub-picture set is used to further identify the sub-pictures across multiple layers or multiple representations to be included in an output bitstream. The output sub-picture set may be carried in a parameter set for layered coding or session negotiation such as video parameter set (VPS), sequence parameter set (SPS) or DPS (Decoder Parameter Set). The output sub-picture set indicates the number of sub-pictures included in the set and the tile group ID of each sub-picture. Each sub-picture may be associated with a layer ID and may be inter-layer predicted from another sub-picture at another dependent layer. The output sub-picture set, along with target temporal layer ID, identifies the sub-picture extraction operation point. The middle-box or client may derive the output sub-bitstream by removing all NAL units with layer ID and sub-picture tile group ID not among the values included in output sub-picture set and removing NAL units with Temporal ID greater than the target temporal layer ID.

In some embodiments, the output sub-picture set include parameters indicating one or more of the output picture size, color format, bit-depth and the layouts of the sub-pictures within the output picture for bitstream packing, output picture reconstruction and rendering. Multiple layouts may be provided for bitstream packing and output picture reconstruction purposes. The sub-picture layout may indicate the position and size of each sub-picture within the output picture. The sub-picture layout may indicate the region-wise transform type such as mirroring, flipping, rotation and scaling of the sub-picture for output picture reconstruction and rendering. In some embodiments, a sub-picture is packed in the bitstream at low resolution but is reconstructed and rendered at upscaled high resolution based on the output sub-picture set signaling.

TABLE 2

Proposed output sub-picture set.

| | Descriptor |
|---|---|
| output_sub_pic_set_rbsp( ) { | |
|   num_output_subpic_sets_minus1 | ue(v) |
|   for( i = 0; i <= num_output_subpic_sets_minus1; i++ ) { | |
|     osps_width_in_luma_samples[ i ] | ue(v) |
|     osps_height_in_luma_samples[ i ] | ue(v) |
|     num_sub_pics_in_osps[ i ] | ue(v) |
|     for( j = 0; j <= num_sub_pics_in_osps[ i ]; j++ ) { | |
|       profile_tier_level( ) | |
|       if( vps_max_layers_minus1 != 0) | |
|         sub_pic_layer_id[ i ][ j ] | ue(v) |
|       sub_pic_id[ i ][ j ] | ue(v) |
|       sub_pic_max_tId[ i ][ j ] | ue(v) |
|       sub_pic_x_offset[ i ][ j ] | ue(v) |
|       sub_pic_y_offset[ i ][ j ] | ue(v) |
|       sub_pic_width_in_luma_samples[ i ][ j ] | ue(v) |
|       sub_pic_height_in_luma_samples[ i ][ j ] | ue(v) |
|       transform[ i ][ j ] | u(4) |
|     } | |
| } | |

Table 2 shows a syntax structure example of a proposed output sub-picture set. Each output sub-picture set (OSPS) in this example specifies the output frame resolution, number of sub-pictures to be output, and the layer ID, sub-picture ID, position and size of each output sub-picture to compose the output frame. In the example of Table 2, the output sub-picture set signals a profile, tier, and/or level for each sub-picture in the set. In some embodiments, this information is signaled in a profile_tier_level( ) data structure for each sub-picture. The element sub_pic_max_tId[i][j] specifies the maximum temporal ID of the associated sub-picture for extraction process. The transform syntax element specifies the type of transform of specific sub-picture to compose the output picture. Each OSPS may also indicate the profile, tier and level it complies to.

In another embodiment, the output sub-picture layout specified by x_offset, y_offset may be optional for the recommended region-wise packing and rendering, and the client can compose and render the output picture in any output layout format. The output picture may have specific skipped regions not filled by any sub-pictures, and the client may decide the filling and rendering method for these skipped areas. FIG. 10 shows an example of output picture with skipped regions (i.e. skipped region #0 and #1).

A parameter set such as VPS or SPS may specify multiple sub-pictures across layers, each sub-picture having its own unique ID. The sub-pictures referring to the same VPS or SPS may originate from the same content but encoded into different versions. An encoded version may refer to a specific spatial resolution, temporal frame rate, color space, depth, or a component. All sub-pictures of the same encoded version may refer to the same SPS across layers.

In cases where the SPS can be shared by multiple layers, the SPS may signal all sub-picture configurations associated with each layer picture, and the PPS or a parameter set associated with a picture consisting of multiple sub-pictures may refer to the index into such sub-picture configuration list. Table 3 shows a proposed SPS syntax structure where num_sub_pic_cfgs_minus1 plus 1 specifies the number of sub-picture configurations available, and each sub-picture configuration may consist multiple sub-pictures, each with its own position and size. The index pps_sub_pic_cfg_idx specified in Table 4 is the index into sub-picture configuration list in the SPS, and the corresponding sub-picture layout applies to the pictures associated with PPS.

TABLE 3

Proposed SPS signaling of sub-pictures.

| | Descriptor |
|---|---|
| seq_parameter_set_rbsp( ) { | |
| sps_max_sub_layers_minus1 | u(3) |
| .... | u(5) |
| num_sub_pic_cfgs_minus1 | ue(v) |
| for ( i = 0; i <= num_sub_pic_cfgs_minus1; i++ ) { | |
| num_sub_pics_minus1[ i ] | ue(v) |
| for ( j = 0; j <= num_sub_pics_minus1[ i ]; j++ ) { | |
| sub_pic_id[ i ][ j ] | u(v) |
| if( num_subpics_minus1[ i ] > 0 ) { | |
| sub_pic_x_offset[ i ] [ j ] | ue(v) |
| sub_pic_y_offset[ i ] [ j ] | ue(v) |
| sub_pic_width_in_luma_samples[ i ] [ j ] | ue(v) |
| sub_pic_height_in_luma_samples[ i ] [ j ] | ue(v) |
| } | |
| } | |
| } | |
| .... | u(1) |
| } | |

TABLE 4

Proposed PPS signaling of sub-pictures.

| | Descriptor |
|---|---|
| pic_parameter_set_rbsp( ) { | |
| pps_pic_parameter_set_id | ue(v) |
| .... | ue(v) |
| pps_sub_pic_cfg_idx | ue(v) |
| .... | u(1) |
| } | |

In another embodiment, all sub-picture configurations may be signaled in the VPS; and SPS, PPS or a parameter set associated with a picture consisting of multiple sub-pictures may refer to the index into such a sub-picture configuration list.

In another embodiment, it is proposed to override the SPS sub-picture configuration at picture level parameter set or header for those sub-pictures whose properties are changed during a coded video sequence (CVS). The override syntax elements may include an override flag, the number of updated sub-pictures and the configuration of the updated sub-picture when override flag is set. Table 5 is a PPS syntax structure example to override the sub-picture position and size specified in SPS or VPS.

TABLE 5

Proposed sub-picture override signal.

| | Descriptor |
|---|---|
| picture_parameter_set_rbsp( ) { | |
| picture_parameter_set_id | u(4) |
| pps_sub_pic_cfg_override_flag | u(1) |
| if ( pps_sub_pic_cfg_override_flag) { | |
| num_sub_pics_minus1[ i ] | ue(v) |

TABLE 5-continued

Proposed sub-picture override signal.

| | Descriptor |
|---|---|
| for( j = 0; i <= num_sub_pics_minus1[ i ]; j++ ) { | |
| sub_pic_id[ i ] [ j ] | ue(v) |
| sub_pic_x_offset[ i ] [ j ] | ue(v) |
| sub_pic_y_offset[ i ] [ j ] | ue(v) |
| sub_pic_width_in_luma_samples[ i ][ j ] | ue(v) |
| sub_pic_height_in_luma_samples[ i ][ j ] | ue(v) |
| } | |
| } | |
| rbsp_trailing_bits( ) | |
| } | |

In another embodiment, the default sub-picture configuration associated with each layer may be signaled in the VPS or DPS, and the SPS may override the sub-picture configuration when the sub-picture configuration associated with the layer referring to the SPS is different from the default sub-picture configuration signaled in the VPS or DPS. A sps_sub_pic_cfg_override_flag may be indicated in SPS to specify the presence of sub-picture configuration syntax elements in the SPS.

Figure 11:
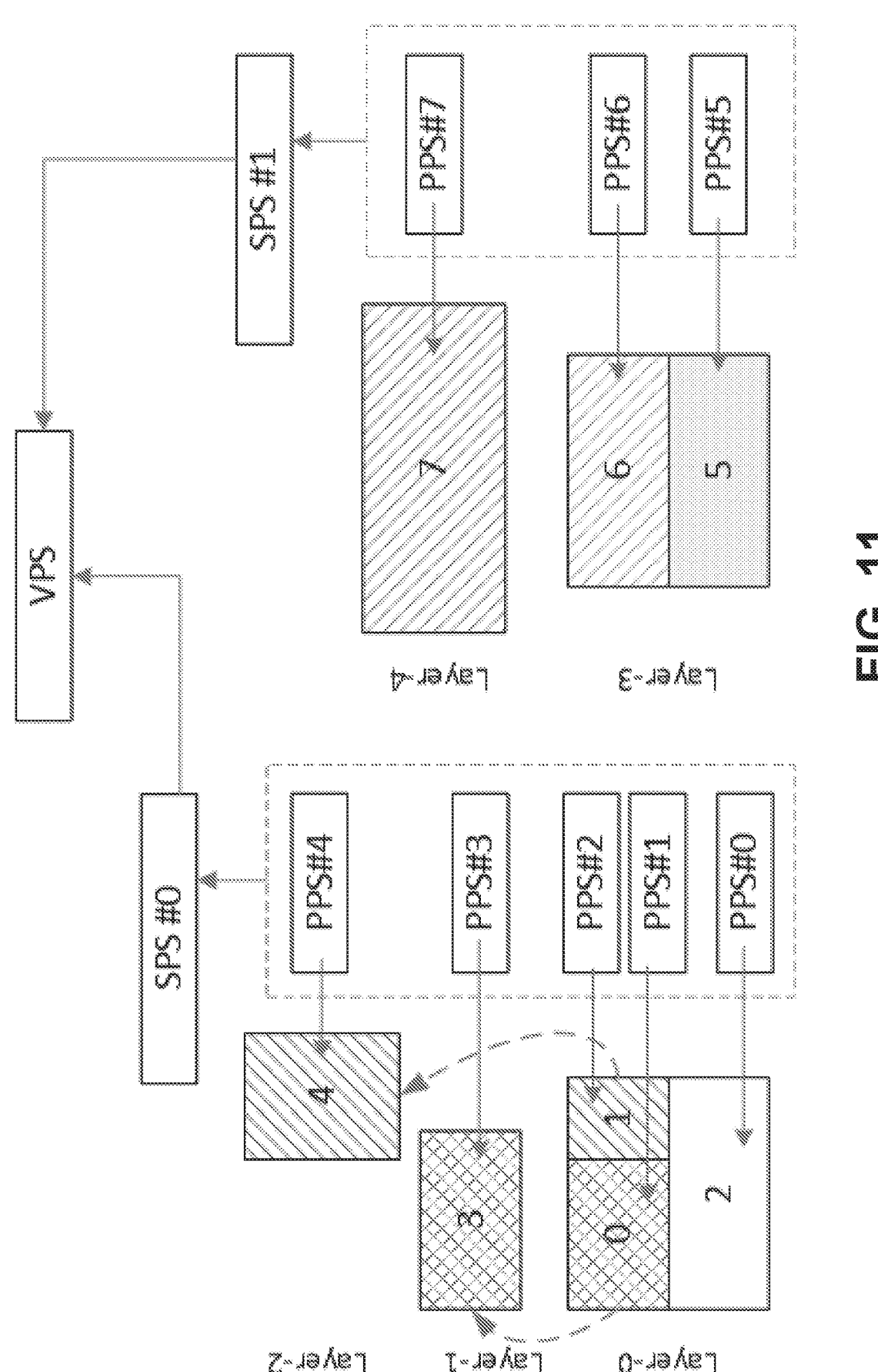
FIG. 11 illustrates an example layer structure.

FIG. 11 illustrates a layer structure example. Sub-picture #0, #1 and #2 represent multiple regions of a first source content. Sub-picture #5 and #6 represent the regions of a second source content. Sub-picture #3 is an enhanced version (e.g. higher resolution) of sub-picture #0, sub-picture #4 is an enhanced version of sub-picture #1, and sub-picture #7 is an enhanced version of sub-picture #6. Sub-picture #3 may be predicted from sub-picture #0, and sub-picture #4 may be predicted from sub-picture #1. Sub-picture #7 is independently coded. A total of five layers are available (Layer-0 through Layer-4); each layer contains one version of the content. A layer may contain the entire picture, or just one or more sub-pictures. Each sub-picture may refer to its own PPS. All layers associated with the same source may refer to the same SPS or VPS. One benefit of sharing the same SPS across layers is a guarantee of coding configurations such as CTU size, bit depth, chroma format, etc. In some embodiments a constraint is proposed that each sub-picture referring the same SPS has a unique sub-picture ID.

Table 6 provides an example of sub-picture correspondence and dependence indicators to indicate the relationship between sub-pictures across layers. When a flag sub_pic_corresponding_flag[i][j] equals 1, an identifier corresponding_sub_pic_id[i][j] is provided to specify the sub-picture that corresponds to the j-th sub-picture of the i-th layer. Corresponding sub-pictures may both cover the same region of the original content, but the resolution, quality and transformation of two sub-pictures may be different.

When a flag sub_pic_dependent_flag[i][j] equals 1, an identifier dependent_sub_pic_id[i][j] specifies the ID of the sub-picture that the j-th sub-picture of the i-th layer is predicted from. In FIG. 11, sub-picture #0 is the dependent sub-picture and corresponding sub-picture of sub-picture #3. Sub-picture #1 is the dependent sub-picture and corresponding sub-picture of sub-picture #4. Sub-picture #6 is not the dependent sub-picture of sub-picture #7 but it is the corresponding sub-picture of sub-picture #7. The base layer picture may carry all regions of source content, and the enhancement layer may carry one or more sub-picture regions. The relative coordination of each enhancement layer sub-picture within the source content may be inferred from the base layer sub-picture layout. In case there are multiple components of content in a layer structure, the layer of the corresponding sub-picture may carry the region coordination information of the source content.

TABLE 6

Proposed sub-picture correspondence and dependence indicator.

| | Descriptor |
|---|---|
| video_parameter_set_rbsp( ) { | |
| vps_video_parameter_set_id | u(4) |
| vps_max_layers_minus1 | u(8) |
| for( i = 0; i <= vps_max_layers_minus1; i++ ) { | |
| vps_included_layer_id[ i ] | u(7) |
| vps_reserved_zero_bit[ i ] | u(1) |
| num_sub_pics_minus1[ i ] | ue(v) |
| for( j = 0; i <= num_sub_pics_minus1[ i ]; j++ ) { | |
| sub_pic_id[ i ][ j ] | ue(v) |
| sub_pic_x_offset[ i ][ j ] | ue(v) |
| sub_pic_y_offset[ i ] [ j ] | ue(v) |
| sub_pic_width_in_luma_samples[ i ][ j ] | ue(v) |
| sub_pic_height_in_luma_samples[ i ][ j ] | ue(v) |
| if ( i > 0 ) { | |
| sub_pic_dependent_flag[ i ][ j ] | u(1) |
| if (sub_pic_dependent_flag[ i ][ j ]) | |
| dependent_sub_pic_id[ i ][ j ] | ue(v) |
| else { | |
| sub_pic_corresponding_flag[ i ][ j ] | u(1) |
| if (sub_pic_corresponding_flag[ i ][ j ] ) | |
| corresponding_sub_pic_id[ i ][ j ] | ue(v) |
| } | |
| } | |
| } | |
| } | |
| rbsp_trailing_bits( ) | |
| } | |

In another embodiment, a list of sub-picture corresponding groups may be specified in a parameter set. The sub-pictures covering the same content region may share the same index into a sub-picture correspondence group list. The coordination relationship among multiple regions may be signaled individually as shown in Table 7.

TABLE 7

Proposed sub-picture correspondence and dependence indicator.

| | Descriptor |
|---|---|
| sub_pic_coordination_rbsp( ) { | |
| num_regions_minus1 | u(8) |
| nominal_pic_width | ue(v) |
| nominal_pic_height | ue(v) |
| for( j = 0; i <= num_regions_minus1; j++ ) { | |
| corresponding_sub_pic_group_idx[ i ] | ue(v) |
| region_x_offset[ i ] | ue(v) |
| region_y_offset[ i ] | ue(v) |
| nominal_region_width [ i ] | ue(v) |
| nominal_region_height [ i ] | ue(v) |
| } | |
| } | |

The value num_regions_minus1 specifies one less than the total number of regions covered by an independently coded region (sub-picture). The values nominal_pic_width and nominal_pic_height specify the nominal picture resolution. The index corresponding_sub_pic_group_idx[i] specifies an index into a corresponding sub-picture group list; the identified corresponding sub-picture covers the i-th region of the picture. The offset values region_x_offset [i] and region_y_offset [i] specify the position of the i-th region, and nominal_region_width[i] and nominal_region_height[i] specify the nominal size of the i-th region.

Sub-Picture Parameter Set.

In some embodiments, a parameter set, sub-picture parameter set, is used to indicate one or more sub-picture parameters such as tile partitioning, coordinates and size of the sub-picture, and the dependent sub-picture layer.

Figure 12:
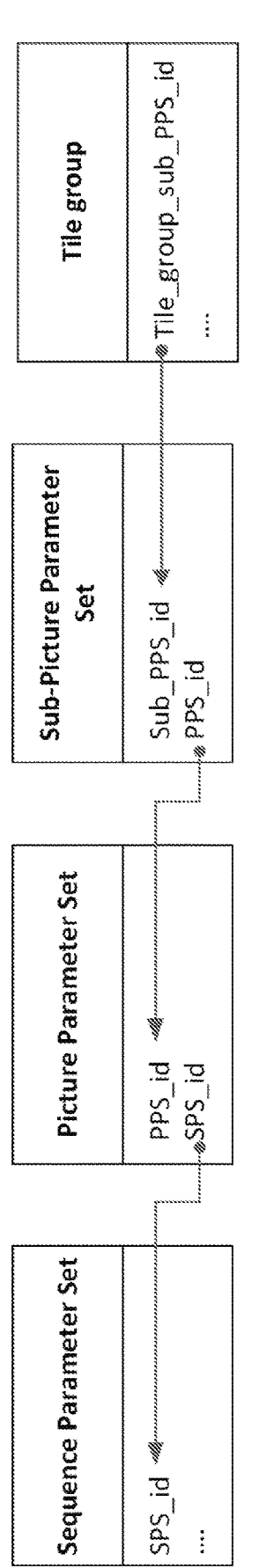
FIG. 12 illustrates an activation order of parameter sets.

The coordinates of the sub-picture may indicate the position of the sub-picture within a picture. The dependent sub-picture layer indicates the layer the current sub-picture may be predicted from. A sub-picture parameter set may also include DPB management signaling, such as reference picture list and maximum DPB buffer size required for each sub-picture. Each sub-picture may refer to its own sub-picture parameter set by the sub-picture parameter set ID. FIG. 12 shows the order of sequence parameter set (SPS), picture parameter set (PPS), sub-picture parameter set (sPPS) and their activation. A sub-picture parameter set is activated when it is referred to by a tile group, a PPS is activated when it is referred to by an sPPS or by a tile group. A sub-picture parameter set is made available to the decoding process prior to its activation, and the NAL unit containing the sPPS may have NAL unit layer ID equal to 0. A tile group may also reference both PPS and sPPS with PPS ID and sPPS ID signaled at the tile group header. A benefit of including syntax elements in an sPPS is to avoid redundant overhead signaled in each tile group header and simplify the sub-bitstream rewriting process.

In some embodiments, during sub-picture extraction, those NAL units containing a sub-picture parameter set that is not referred to by the tile groups of the sub-picture included in the sub-picture set are removed.

DPB Management for Sub-Pictures.

A decoded picture buffer (DPB) holds decoded pictures for reference, output reordering, or output delay specified for the hypothetical reference decoder. Some embodiments exploit the independent coding of each sub-picture by employing a DPB structure that operates at the sub-picture level. In some embodiments, each sub-picture shares the same reference picture list with other sub-pictures within a picture. In some embodiments, each sub-picture may have its own reference picture list to improve the coding performance; in such embodiments, the corresponding reference picture list may be signaled in sub-picture parameter set.

In JCTVC-O0217, "Sub-DPB based DPB operations", October 2013, two modes of sub-DPB operations were proposed: (i) layer-specific sub-DPB mode where a separate sub-DPB is allocated for each layer, and (ii) resolution-specific sub-DPB mode where all pictures that have the same spatial resolution, color format and bit depth share the same sub-DPB.

In some embodiments, a DPB is partitioned into multiple sub-DPBs, and each sub-DPB is managed independently for each sub-picture. Sub-picture specific sub-DPB mode allows a decoded sub-picture to be inserted, marked and removed independently from other sub-pictures. In some embodiments, the maximum sub-DPB size, maximum number of reordered pictures, and maximum latency increase is signaled in the PPS or SEI message for each sub-picture for the session negotiation. This allows the middlebox or client to derive the maximum DPB size to be used for sub-picture repositioning. The PPS may be the appropriate parameter set to carry sub-picture relevant properties across multiple sub-pictures.

Figure 13:
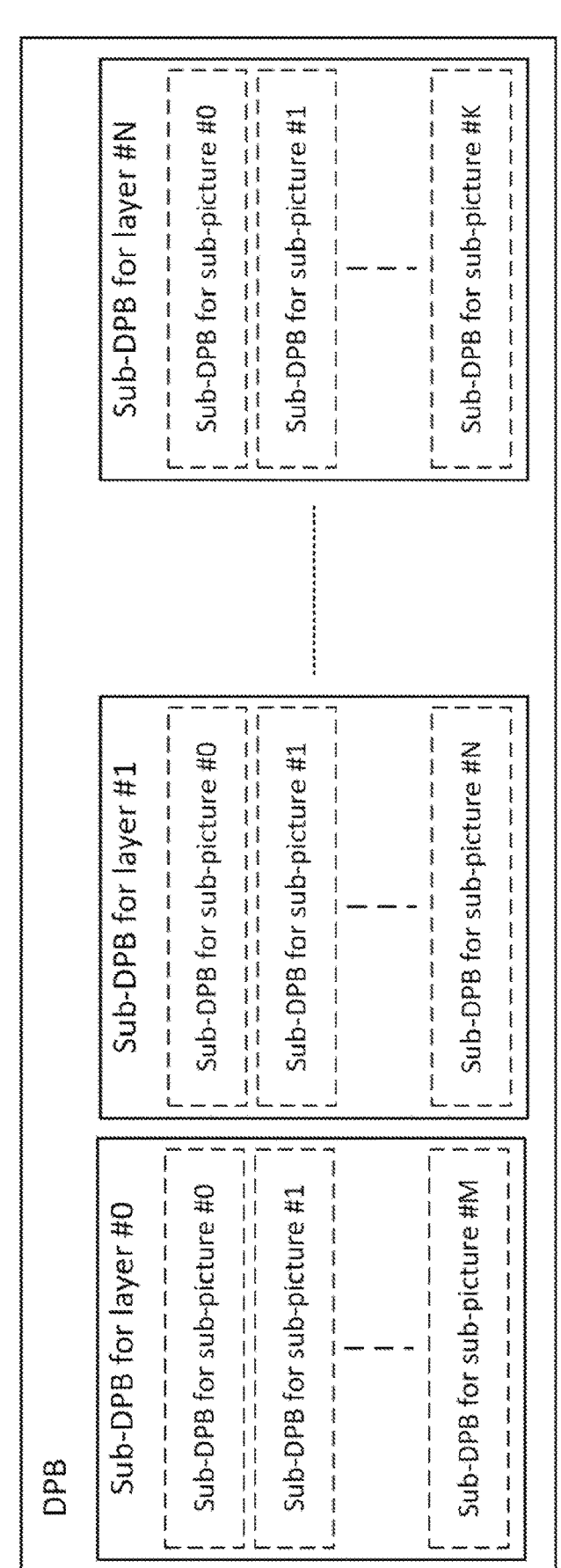
FIG. 13 illustrates an example of a sub-DPB structure.

FIG. 13 illustrates an example of DPB partitioning into multiple layer-based sub-DPBs. Each layer-based sub-DPB may be further partitioned into multiple sub-picture-based sub-DPBs. Each sub-picture may be coded differently within its corresponding sub-DPB.

Methods as described herein using sub-DPBs for sub-pictures may simplify the decoding process when a region-wise packing method may rotate or flip the sub-picture, or pack the sub-picture to a different position within a picture. Since each sub-picture is independently encoded, the sub-picture may find its reference sub-picture inside a specific sub-DPB based on picture order count (POC), temporal ID and tile group ID regardless the coordinate of the sub-picture within a picture.

For sub-picture switching such as adaptive resolution change (ARC), the SEI message or external means may indicate the first sub-picture identifier before ARC switching and the second sub-picture after ARC switching. Constraints may apply to the ARC sub-pictures to provide for a consistent decoding process. For example, the second sub-picture after switching may have the same temporal sub-layer structure and coding structure as the first sub-picture before ARC; such a constraint ensures the reference pictures of the second sub-picture may be derived from the reference pictures of the first sub-picture available in DPB (e.g. in one of the sub-DPBs). The POC value of sub-pictures of the sub-picture sequences before and after ARC switching are preferably aligned. For example, if ARC operation switches from sub-picture #A to sub-picture #B, sub-picture #A and #B may be coded in different resolution, color format or bit depth. Sub-DPB #A is allocated for sub-picture #A, sub-DPB #B is allocated to sub-picture #B. During ARC, the client may increase or decrease the buffer size to match the size of sub-DPB #B. The reference pictures in sub-DPB #A are scaled or transformed to align with the properties of sub-picture #B, including a new resolution, color format and/or bit depth. Those scaled or transformed reference pictures are then assigned to sub-DPB #B, and sub-DPB #A may be freed.

POC Value Derivation.

HEVC and VVC operate to reset the POC value to zero for an instantaneous decoding refresh (IDR) picture and to reset PicOrderCntMsb to zero for an intra random access point (IRAP) picture with NoRaslOutputFlag equal to 1. In case different representation has different IRAP distance, an output picture from sub-picture extraction and reposition process may consist of a different type of sub-picture NAL units, and the derived POC value of associated sub-picture or tile group may not be aligned.

In some embodiments, in order to align the POC value among the sub-pictures within a picture, the POC LSB value signaled at tile group header is rewritten. The length of the tile_group_pic_order_cnt_lsb syntax element is log 2_max_pic_order_cnt_lsb_minus4+4 bits, and the log 2_max_pic_order_cnt_lsb_minus4 syntax element is signaled at SPS of associated representation. A constraint to require SPSs associated with sub-pictures across representations to share the same value of log 2_max_pic_order_cnt_lsb_minus4 is proposed for some embodiments to simplify the tile_group_pic_order_cnt_lsb element syntax rewriting process. In other embodiments, log 2_max_pic_order_cnt_lsb_minus4 may be explicitly signaled for each sub-picture at PPS or sub-picture parameter set.

In case one or more NAL units type is IDR, the POC value of the associated sub-picture is zero and may not be the same as the POC value of other non-IDR sub-pictures within the same picture. A POC reset scheme is proposed in some embodiments to reset tile_group_pic_order_cnt_lsb value of all sub-pictures to zero when at least one IDR sub-picture is included in the picture.

Since PicOrderCntMsb may not be consistent between the input sub-picture bitstreams and output repositioned bitstream, the long term reference picture may not be allowed for the ARC picture and the pictures following ARC picture in decoding order.

In some embodiments, a POC reset flag is carried by each sub-picture or sub-picture parameter set so that the POC derivation may be made by external means regardless of the previous picture.

Figure 14:
FIG. 14 illustrates a POC derivation example for sub-picture extraction and repositioning.

FIG. 14 shows an example of POC value reset for the picture created from three sub-pictures. The IDR interval of sub-picture #0 is 8 and the IDR interval of sub-picture #1 and #2 is 4. The newly formed picture POC value is reset to 0 when at least one IDR NAL unit is included in the access unit or the POC reset flag is set externally.

Output Parameter Set.

Numerous coding configuration parameters and coding enable flags may be specified in an SPS to indicate syntax element length, coding unit size and tool configurations that apply to an entire coded video sequence (CVS). For example, log 2_ctu_size_minus2 defines the CTU size, log 2_min_luma_coding_block_size_minus2 defines the minimum luma coding block size, sps_sao_enabled_flag determines whether the sample adaptive offset process is applied to the reconstructed picture. Each representation may use its own coding parameter settings, and each representation CVS may refer to different SPSs. After sub-picture extraction and reposition, a single output CVS is formed and it refers to one SPS. The values of those SPS configuration parameters may then apply to all sub-pictures from multiple representations. One way to align them is to require all sub-pictures included in the output sub-picture set to refer to an identical SPS or to share the same parameter value. However, the coding performance may be impacted if high resolution and low resolution representations are coded in the same configuration. One alternative embodiment is to explicitly signal these configuration parameters or coding enable flags individually for each sub-picture included in the output sub-picture set in the PPS or SPS, and each sub-picture may refer to the corresponding coding configuration parameters using a sub-picture identifier.

Figure 15:
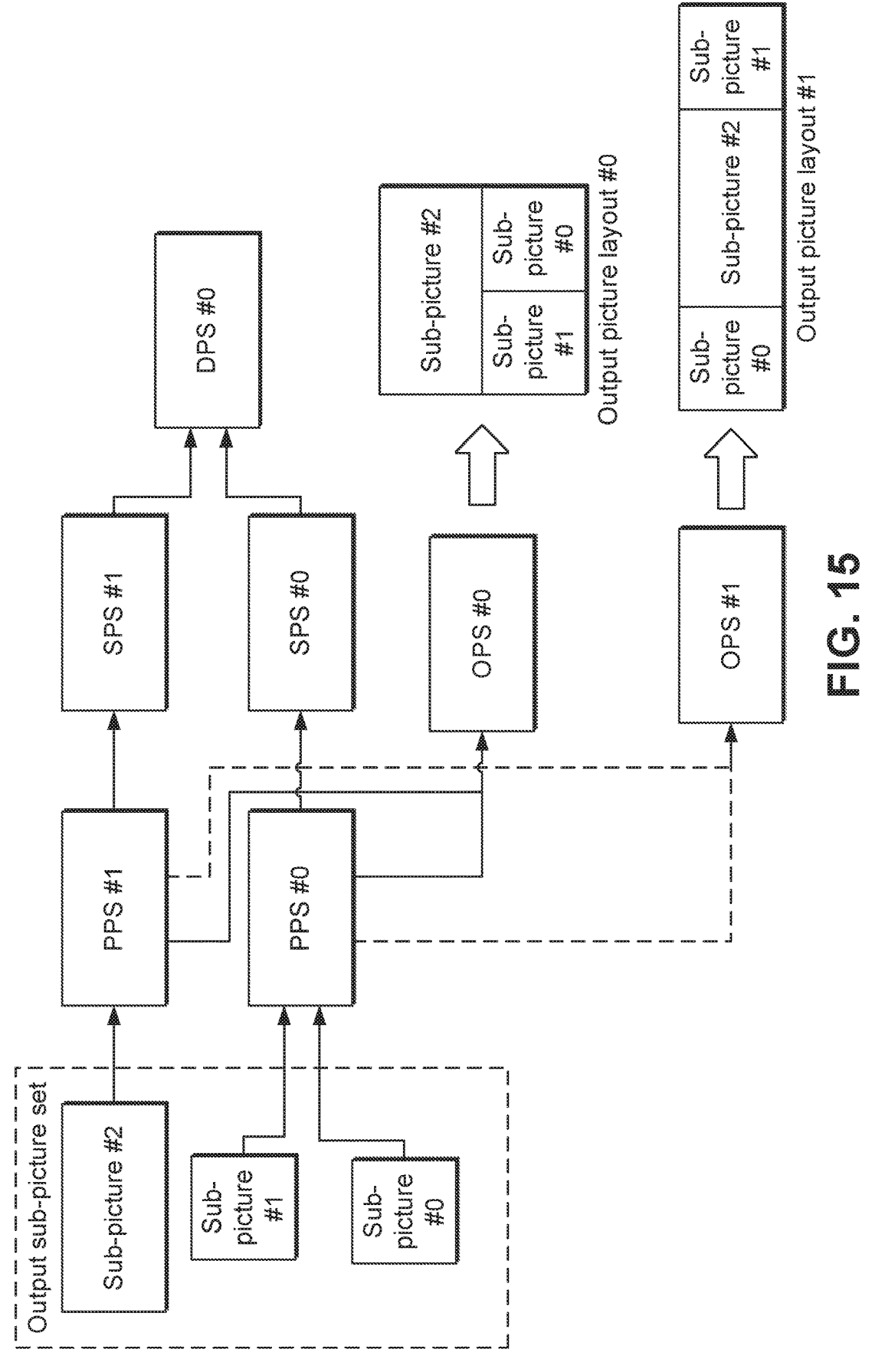
FIG. 15 illustrates a hierarchical parameter sets structure example for sub-pictures.

In another embodiment, each sub-picture may be treated as a single picture: it may refer to its own PPS, each PPS may refer to SPS as specified in HEVC or VVC, and multiple SPSs may refer to a DPS which covers all potential coding parameters or maximum coding capability for the entire decoding sequence. In some embodiments, the properties of the composed output picture such as output picture resolution and sub-picture layout are signaled as syntax elements in a PPS or SPS. In some embodiments, the properties of the composed output picture such as output picture resolution and sub-picture layout are signaled in a separate parameter set, e.g. an output parameter set (OPS). The OPS can be used to indicate the properties of output picture for rendering and presentation; the properties may include output picture size and the layout of repositioned sub-pictures. The OPS may be referred by a PPS or sub-picture parameter set. FIG. 15 shows an example of relationships among parameter sets where the same sub-picture may associate with multiple output picture resolutions and layouts.

Sub-Picture Extraction and Reposition Process.

HEVC specifies a sub-bitstream extraction process to extract a sub-bitstream from an input layer bitstream by removing all NAL units with TemporalID greater than tIdTarget and all NAL units with nuh_layer_id not equal to lIdTarget.

New media applications may operate to extract multiple sub-picture streams from different layers of a layer bitstream and to merge extracted sub-bitstreams together in certain order to form a new conformance bitstream. A sub-bitstream extraction and reposition process is proposed here. Inputs to this process are a bitstream and a target sub-picture set subPicSetTarget. An output of this process is a bitstream.

To achieve bitstream conformance for the input bitstream, the following conditions may be imposed. Any output sub-bitstream that is the output of the process specified here with the bitstream, every nuh_layer_id value, lIdTarget, associated with subPicSetTarget specified in the active VPS equal to any value in the range of 0 to 126, inclusive, and every highest temporal ID value, tIdTarget, associated with sub-PicSetTarget specified in the active VPS equal to any value in the range of 0 to 6, inclusive, and sub-picture ID value, sIdtarget, equal to sub_pic_id associated with subPicSetTarget specified in the active VPS as inputs, and that satisfies the following condition shall be a conforming bitstream:

The output sub-bitstream contains at least one VCL NAL unit with sub_pic_id equal to lIdTarget, TemporalID equal to tIdTarget and nuh_layer_id equal to lIdTarget.

The extracted sub-bitstream may be derived in a method that includes (i) removing all NAL units with a TemporalID greater than tIdTarget, and (ii) removing all NAL units with nuh_layer_id not equal to lIdTarget.

The repositioned bitstream may be derived in a method that includes merging the collocated access unit of extracted sub-bitstreams in the order as specified in subPicSetTarget. An access unit of an extracted sub-bitstream represents a frame of corresponding sub-picture. Collocated access units of multiple sub-pictures may share the same time stamp such as picture order count.

The order of NAL units of different sub-picture may be signaled in output sub-picture set, or inferred from the sub-picture layout indicated in output sub-picture set. Each access unit of an output picture may consist of multiple groups of NAL units of a sub-picture in the order specified in the output sub-picture set.

Layer Structure for Immersive Media Access and Delivery.

Figure 16:
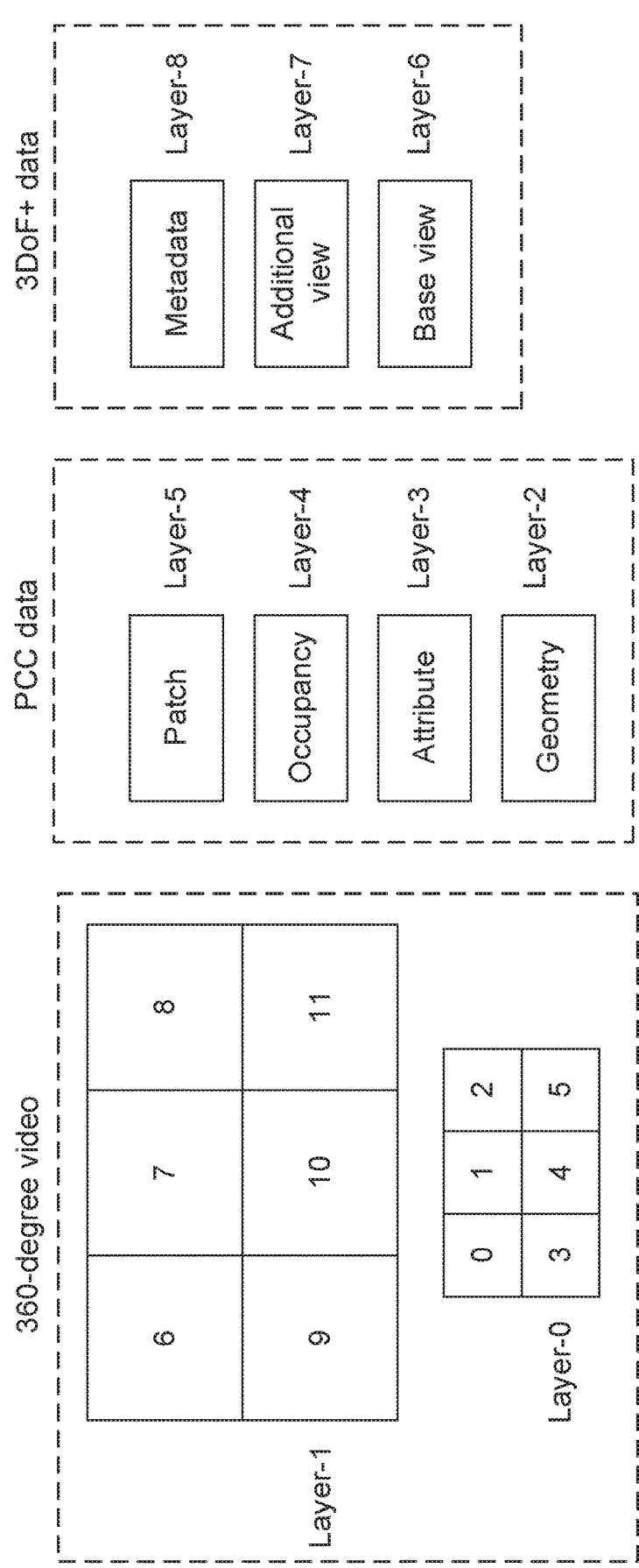
FIG. 16 illustrates a layer structure for multiple media types.

Different media types (e.g. video data, metadata), components (e.g. geometry, texture, attribute, depth, tiles), encoded versions (resolution, frame rate, bit depth, color space, codec) may be referred to as different representation data at different layers. A combination of specific layers may output to form an output bitstream to support an application. A client may access and present reconstructed media data with entire or partial representations. FIG. 16 illustrates one example where 360-degree scalable video, PCC data and 3DoF+ data are multiplexed in a layer bitstream. Different layers may be in different formats and encoded by different media encoders.

Several syntax elements may be specified in cross layer media parameter set to support immersive media access, delivery and rendering as follows. An example syntax structure is illustrated in Table 8.

In some embodiments, a layer-available flag is used to specify whether the representation data associated with the specific layer is available within the bitstream or provided by external means out of the specification scope. For example, mps_layer_available_flag[i] specified in Table 8 indicates whether the i-th layer is available in the layer bitstream (mps_layer_available_flag [i] equal to 1) or provided by external means (mps_layer_available_flag[i] equal to 0).

In some embodiments, a layer-presentation flag is used to specify whether the representation data of associated layer is intended to be output individually or not. For example, a layer with geometry video data associated with a point cloud object may not be output, decoded and rendered independently. For example, mps_layer_output_flag[i] specified in Table 8 indicates whether the i-th layer can be decoded and output independently or not.

A mapping table may map each layer representation data to a specific media type, a component of specific media, and/or subset of a representation data. For example, layer representation data may represent specific tile group of a point cloud geometry video data, and such mapping can be derived from the layer ID and sub-picture ID. For example, mps_media_type specified in Table 8 indicates the media types or codec type included in the layer structure. The index mps_media_type_idx[i] specifies the index into the list of mps_media_type syntax structure that is used to map to specific media or component type.

In some embodiments, an output media set is used to specify a number of layer representation data, and/or subset of a specific layer representation data with temporal ID, sub-picture ID or slice ID to form an output bitstream representing an entire or partial media presentation. An output media set may also indicate the output representation data rate, the maximum resolution and codec profile, tier and level supported. The syntax element, mps_num_output_set_minus1 specified in Table 8 indicates the number of output media set. The element mps_media_type_idx[i] specifies the media type of i-th output set, and num_sub_layers[i] specifies the number of sub-pictures or sub-components (e.g. VPCC geometry layer) to be included in the i-th output set.

TABLE 8

Proposed media parameter set.

| | Descriptor |
|---|---|
| media__parameter__set__rbsp( ) { | |
| mps__parameter__set__id | u(4) |
| mps__max__media__types__minus1 | u(8) |
| for( i = 0; i <= mps__max__media__types__minus1; i++ ) | |
| mps__media__type[ i ] | u(8) |
| mps__max__layers__minus1 | u(8) |
| for( i = 0; i <= mps__max__layers__minus1; i++ ) { | |
| mps__layer__id[ i ] | u(7) |
| mps__layer__available__flag[ i ] | u(1) |
| mps__layer__output__flag[ i ] | u(1) |
| mps__media__type__idx[ i ] | u(8) |
| } | |
| mps__num__output__set__minus1 | u(8) |
| for( i = 0; i <= mps__num__ output__set__minus1; i++ ) { | |
| mps__media__type__idx[ i ] | |
| profile__tier__level( ) | |
| layer__id[ i ] | u(8) |
| num__sub__layers[ i ] | u(8) |
| if ( num__sub__layers[ i ] ) | |
| for ( j = 0; j < num__sub__layers[ i ] ) | |
| sub__layer__id[ i ][ j ] | u(8) |
| } | |
| rbsp__trailing__bits( ) | |
| } | |

Within each layer representation data, sub-layer data set is proposed for some embodiments to indicate a conforming sub-layer bitstream. The set may use NAL unit type, Temporal ID, sub-picture ID to identify a sub-layer output data. The sub-layer data set may also use byte offset or number of bytes to indicate sub-layer data included in the layer data. The sub-layer data set ID may be used in an output media set to extract and reposition the output media representation data.

In an embodiment illustrated in Table 9, num_sub_layer_minus1 specifies one less than the total number of sub-layers for a specific layer data. The identifier of i-th sub-layer is specified by sub_layer_id[i]. The element sub_layer_entry_count_minus1 plus 1 specifies the number of sub-layer entries available in a layer data. The data length of i-th entry is indicated by entry_byte_length[i]. The element sub_layer_idx[i] specifies the index of sub-layer set associated with the i-th entry.

TABLE 9

Proposed sub-layer data set.

| | Descriptor |
|---|---|
| sub_layer_data_set_rbsp( ) { | |
| num_sub_layer_minus1 | u(8) |
| for ( i = 0; i <= num_sub_layer_minus1; i++ ) | |
| sub_layer_id[ i ] | u(8) |
| sub_layer_entry_count_minus1 | |
| for( i = 0; i <= sub_layer_entry_count_minus1; i++ ) { | |
| sub_layer_idx[ i ] | u(8) |
| entry_byte_length[ i ] | u(32) |
| } | |
| rbsp_trailing_bits( ) | |
| } | |

In some embodiments, a client or middle box may extract partial media representation data based on the output media set. The client may apply a specific media codec for each layer or sub-layer representation to reconstruct full or partial media data based on the proposed media parameter set and sub-layer data set. In case only a portion of media data can be reconstructed, a space mapping between layer or sub-layer data and the target 3D presentation space may be used.

For example, a multiple layer representation may include both 360-degree video and a point cloud object. A group of layers may represent a specific VPCC object and another group of layers may represent a 360-degree video. A layer data associated with a specific VPCC object may represent a VPCC component (e.g. attribute), and sub-layer data may represent an independent decodable region of a component such as a VPCC geometry slice, or a component dimension such as VPCC geometry layer or attribute type. In case the client partially renders a VPCC object on a 360-degree video background, the client may not have to access all 360-degree video and VPCC data. A client may access one slice of each component associated with a VPCC object based on one output media set, and the client may access specific viewport data of 360-degree video based on another output media set. The client can reconstruct partial VPCC object and 360-degree viewport by decoding, composing and rendering two output media sets.

Syntax Design Overview.

Example systems and methods described herein employ a high-level syntax design that supports a sub-picture extraction and reposition process. An input video may be encoded into multiple representations, each representation may be represented as a layer. A layer picture may be partitioned into multiple sub-pictures. Each sub-picture may have its own tile partitioning, resolution, color format and bit depth. Each sub-picture is encoded independently from other sub-pictures of the same layer, but it may be inter-predicted from the corresponding sub-pictures from its dependent layers. Each sub-picture may refer to a sub-picture parameter set where the sub-picture properties are signaled. The sub-picture properties may include information such as the resolution of each sub-picture and coordinates indicating a position of each sub-picture within an output picture. Each sub-picture parameter set may refer to a PPS where the resolution of the entire picture is signaled.

The POC value of each sub-picture NAL unit within the associated picture is preferably consistent, and the NAL unit type may be different with an access unit. A POC reset method is used to ensure IDR NAL unit and non-IDR NAL unit share the same POC value.

The DPB is partitioned into multiple sub-DPBs, each sub-DPB is associated with a sub-picture. The maximum sub-DPB size and reordered picture number may be signaled for each sub-picture for session negotiation.

The output sub-picture set is used to indicate the sub-pictures to be extracted and repositioned for an output picture. The sub-picture extraction process removes all NAL units whose sub-picture identifier or tile group ID not included in the output sub-picture set and removes all NAL units whose temporal ID is greater than the target temporal ID.

After repositioning the sub-pictures for an output picture, each sub-picture parameter set may refer to a new PPS associated with the output picture. The POC value of each sub-picture may be derived based on the POC anchor picture of the new output sequence. The constraints are proposed to enable ARC and enable the corresponding reference pictures to be available in DPB. During ARC, the reference pictures of previous sub-picture may be scaled and transformed to match the ARC sub-picture switched to. The scaled and transformed reference pictures are placed in the sub-DPB associated with the new sub-picture and the sub-DPB associated with the previous sub-picture is freed. The size of each sub-picture of the output picture may change, and the size of the output picture may also change. The maximum output picture resolution, profile and level may be signaled in the output sub-picture set, or the output parameter set associated with the sub-picture extraction and reposition process.

Example Systems and Methods.

Figure 17:
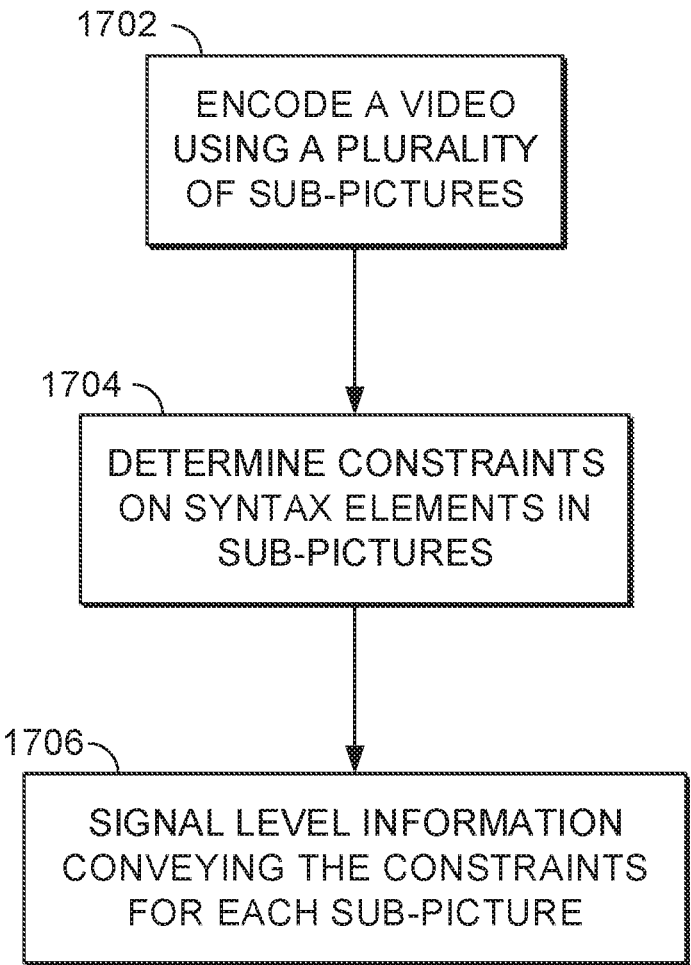
FIG. 17 is a flow chart of a method performed in some embodiments.

As illustrated in FIG. 17, a method performed in some embodiments includes encoding (1702), in a bitstream, a video including at least one picture comprising a plurality of sub-pictures. The sub-pictures may be encoded using constraints determined (1704) for the sub-pictures. Level information for each of the respective sub-pictures is signaled (1706) in the bitstream, where the level information indicates, for each sub-picture, a predefined set of constraints on values of syntax elements of the respective sub-picture.

In some embodiments, a method includes decoding, from the bitstream, level information for each of a plurality of respective sub-pictures, wherein the level information indicates, for each sub-picture, a predefined set of constraints on values of syntax elements of the respective sub-picture; and decoding a plurality of the sub-pictures from the bitstream according to the level information.

In some embodiments, a signal is provided, where the signal includes information encoding a video including at least one picture comprising a plurality of sub-pictures; and level information for each of the respective sub-pictures; wherein the level information indicates, for each sub-picture, a predefined set of constraints on values of syntax elements of the respective sub-picture. The signal may be stored on a computer-readable medium. The computer-readable medium may be a non-transitory medium.

In some embodiments, an apparatus is provided with one or more processors configured to perform an encoding method as illustrated in FIG. 17.

In some embodiments, an apparatus is provided with one or more processors configured to perform a methods includes decoding, from the bitstream, level information for each of a plurality of respective sub-pictures, wherein the level information indicates, for each sub-picture, a pre-defined set of constraints on values of syntax elements of the respective sub-picture; and decoding a plurality of the sub-pictures from the bitstream according to the level information.

In some embodiments, an apparatus as described herein is provided with at least one of (i) an antenna configured to receive a signal, the signal including data representative of the image, (ii) a band limiter configured to limit the received signal to a band of frequencies that includes the data representative of the image, or (iii) a display configured to display the image. The device may be, for example, a TV, a cell phone, a tablet, an STB, or a middle box.

In some embodiments, an apparatus includes an accessing unit configured to access data that includes a plurality of sub-pictures and level information for each of the sub-pictures. The apparatus may further include a transmitter configured to transmit the data.

In some embodiments, a method comprises accessing data including a plurality of sub-pictures and level information for each of the sub-pictures. The method may further include transmitting the data including the plurality of sub-pictures and level information for each of the sub-pictures.

In some embodiments, a computer-readable media and computer program product is provided comprising a plurality of sub-pictures and level information for each of the sub-pictures.

In some embodiments, a computer-readable medium comprises a plurality of sub-pictures and level information for each of the sub-pictures.

In some embodiments, a computer-readable medium includes instructions for causing one or more processors to perform: encoding, in a bitstream, a video including at least one picture comprising a plurality of sub-pictures; and signaling, in the bitstream, level information for each of the respective sub-pictures; wherein the level information indicates, for each sub-picture, a predefined set of constraints on values of syntax elements of the respective sub-picture.

In some embodiments, a computer-readable medium includes instructions for causing one or more processors to perform: decoding, from the bitstream, level information for each of a plurality of respective sub-pictures, wherein the level information indicates, for each sub-picture, a predefined set of constraints on values of syntax elements of the respective sub-picture; and decoding a plurality of the sub-pictures from the bitstream according to the level information.

In some embodiments, a computer program product includes instructions which, when the program is executed by one or more processors, causes the one or more processors to perform: encoding, in a bitstream, a video including at least one picture comprising a plurality of sub-pictures; and signaling, in the bitstream, level information for each of the respective sub-pictures; wherein the level information indicates, for each sub-picture, a predefined set of constraints on values of syntax elements of the respective sub-picture.

In some embodiments, a computer program product includes instructions which, when the program is executed by one or more processors, causes the one or more processors to perform: decoding, from the bitstream, level information for each of a plurality of respective sub-pictures, wherein the level information indicates, for each sub-picture, a predefined set of constraints on values of syntax elements of the respective sub-picture; and decoding a plurality of the sub-pictures from the bitstream according to the level information.

Additional Embodiments

In some embodiments, a video bitstream rewriting method includes: receiving an input bitstream comprising a plurality of NAL units, each NAL unit having a layer ID and a sub-picture tile group ID; selecting a temporal ID and an output sub-picture set, wherein the output sub-picture set identifies at least one layer ID and at least one tile group ID; and performing a rewriting process on the input bitstream to generate a sub-bitstream, wherein the re-writing process includes removing from the input bitstream (i) NAL units having a layer ID not identified in the output sub-picture set (ii) NAL units having a tile group ID not identified in the output sub-picture set, and (iii) NAL units having a temporal ID greater than the selected temporal ID.

In some embodiments, the input bitstream further includes at least one sub-picture parameter set.

In some embodiments, the sub-picture parameter set includes information indicating one or more of the following: tile partitioning, coordinates of the sub-picture within a picture, size of the sub-picture, and a dependent sub-picture layer.

In some embodiments, the sub-picture parameter set includes decoded picture buffer management signaling.

In some embodiments, the decoded picture buffer management signaling includes one or more of the following: a reference picture list and a maximum decoded picture buffer (DPB) buffer size for each sub-picture.

In some embodiments, the sub-picture parameter set includes an identifier of a picture parameter set (PPS).

In some embodiments, the re-writing process further includes removing from the input bitstream (iv) NAL units containing a sub-picture parameter set not referred to by the tile groups of the sub-picture included in the output sub-picture set.

In some embodiments, a video decoding method comprises: receiving a bitstream of a video comprising a plurality of sub-pictures, wherein the bitstream includes, for at least one of the sub-pictures, DPB information indicating at least one of the following: a maximum sub-DPB size, a maximum number of reordered pictures, and a maximum latency increase; based on the DPB information, partitioning a DPB into a plurality of sub-DPBs, each sub-DPB being associated with a corresponding sub-picture; and decoding each of the sub-pictures using the corresponding sub-DPB.

In some embodiments, the video comprises a plurality of layers, and each sub-DPB is associated with a corresponding layer and a corresponding sub-picture.

In some embodiments, the DPB information is included in a PPS in the bitstream.

In some embodiments, a method includes receiving a bitstream of a video, the video comprising a plurality of pictures, each picture comprising a plurality of sub-pictures; and in response to a determination that at least one of the sub-pictures in a corresponding picture is an instantaneous decoding refresh (IDR) picture, setting a picture order count (POC) value of the corresponding picture to zero.

In some embodiments a method includes: receiving a bitstream of a video, the bitstream encoding a plurality of sub-pictures, wherein the bitstream further includes an output parameter set (OPS), where the OPS indicates positions of the sub-pictures in an output picture; decoding the sub-pictures; and composing an output picture by positioning the decoded sub-pictures according to the OPS.

In some embodiments, a method includes: receiving a video comprising an input picture; partitioning the input picture into a plurality of sub-pictures; encoding each of the sub-pictures in at least two layers using scalable coding, each of the sub-pictures being encoded independently from other sub-pictures; and encoding a sub-picture parameter set for each sub-picture, wherein the sub-picture parameter set indicates layer dependency for inter-layer prediction of the respective sub-picture.

In some embodiments, each sub-picture corresponds to a tile group, and a tile group header of each respective tile group refers to a corresponding sub-picture parameter set.

In some embodiments, the sub-picture parameter sets refer to a picture parameter set (PPS).

In some embodiments, each sub-picture parameter set identifies a resolution of the corresponding sub-picture.

In some embodiments, each sub-picture parameter set identifies a position of the corresponding sub-picture in an output picture.

In some embodiments, a video bitstream rewriting method comprises: receiving an input bitstream comprising a plurality of NAL units, each NAL unit having a layer ID and a sub-picture ID; receiving an output sub-picture parameter set, wherein the output sub-picture parameter set specifies, for each of a plurality of output sub-picture sets, a layer ID and a sub-picture ID of each sub-picture in the respective output sub-picture set; selecting (i) a temporal ID and (ii) an output sub-picture set identified in the output sub-picture parameter set; and performing a rewriting process on the input bitstream to generate a sub-bitstream, wherein the re-writing process includes removing from the input bitstream (i) NAL units of sub-pictures that are not in the selected output sub-picture set, as indicated by layer ID and sub-picture ID, and (ii) NAL units having a temporal ID greater than the selected temporal ID.

In some embodiments, the output sub-picture parameter set further specifies, for each output sub-picture set, a sub-picture offset position of each sub-picture within the respective output sub-picture set.

In some embodiments, the output sub-picture parameter set further specifies, for each output sub-picture set, a sub-picture width and height of each sub-picture within the respective output sub-picture set.

In some embodiments, the output sub-picture parameter set further specifies, for each output sub-picture set, width and height of the respective output sub-picture set.

In some embodiments, the sub-picture ID is a tile group ID.

In some embodiments, a video decoding method comprises: receiving an input bitstream comprising a plurality of sub-pictures, each sub-picture having a respective sub-picture ID; receiving an output sub-picture parameter set, wherein the output sub-picture parameter set specifies, for a plurality of output sub-picture sets including at least one selected output sub-picture set, a sub-picture ID of each sub-picture in the selected output sub-picture set; decoding each of the sub-pictures in the selected output sub-picture set; and composing the decoded sub-pictures into an output frame.

In some embodiments, the output sub-picture parameter set further specifies, for the selected output sub-picture set, a sub-picture offset position of each sub-picture within the respective output sub-picture set, wherein composing the decoded sub-pictures comprises positioning each of the decoded sub-pictures at the respective offset position.

In some embodiments, the output sub-picture parameter set further specifies, for the selected output sub-picture set, a sub-picture width and height of each sub-picture within the respective output sub-picture set, and composing the decoded sub-pictures comprises scaling each of the decoded sub-pictures to the respective width and height.

In some embodiments, the output sub-picture parameter set further specifies, for the selected output sub-picture set, a width and height of the respective output sub-picture set.

In some embodiments, the sub-picture ID is a tile group ID.

In some embodiments, a video bitstream rewriting method comprises: receiving an input bitstream comprising a plurality of NAL units, each NAL unit having a layer ID and a sub-picture ID; receiving a picture parameter set, wherein the picture parameter set specifies, for each of a plurality of sub-picture configurations, a sub-picture ID of each sub-picture in the respective sub-picture configuration; selecting (i) a temporal ID and (ii) a sub-picture configuration identified in the output sub-picture parameter set; and performing a rewriting process on the input bitstream to generate a sub-bitstream, wherein the re-writing process includes removing from the input bitstream (i) NAL units of sub-pictures that are not in the selected sub-picture configuration, as indicated by sub-picture ID, and (ii) NAL units having a temporal ID greater than the selected temporal ID.

In some embodiments, a video decoding method includes: receiving an input bitstream comprising a plurality of sub-pictures, each sub-picture having a respective sub-picture ID; receiving a sequence parameter set, wherein the sequence parameter set specifies, for each of a plurality of sub-picture configurations including a selected sub-picture configuration, a sub-picture ID of each sub-picture in the respective sub-picture configuration; decoding each of the sub-pictures in the selected output sub-picture set; and composing the decoded sub-pictures into an output frame.

In some embodiments, the sequence parameter set further specifies, for the selected sub-picture configuration, a sub-picture offset position of each sub-picture in the selected sub-picture configuration, and composing the decoded sub-pictures comprises positioning each of the decoded sub-pictures at the respective offset position.

In some embodiments, the sequence parameter set further specifies, for the selected sub-picture configuration, a sub-picture width and height of each sub-picture within the selected sub-picture configuration, and composing the decoded sub-pictures comprises scaling each of the decoded sub-pictures to the respective width and height.

Some embodiments further include receiving a picture parameter set that includes a sub-picture configuration index, wherein the selected sub-picture configuration is selected based on the sub-picture configuration index.

In some embodiments, a video decoding method includes: receiving an input bitstream comprising a plurality of sub-pictures, each sub-picture having a respective sub-picture ID; receiving a picture parameter set, wherein the picture parameter set includes a sub-picture configuration override flag; in response to a determination that the sub-picture configuration override flag is set, determining a sub-picture output configuration conveyed in the picture parameter set, including an ID of each sub-picture in the output configuration; decoding each of the sub-pictures in the output configuration; and composing the decoded sub-pictures into an output frame.

In some embodiments, a video decoding method includes: receiving an input bitstream comprising a plurality of sub-pictures, each sub-picture having a respective sub-picture ID; receiving a video parameter set, the video parameter set indicating, for each sub-picture, whether the sub-picture is dependent on another sub-picture; and decoding the input bitstream according to the video parameter set.

In some embodiments, the video parameter set further indicates, for each sub-picture that is indicated to be dependent on another sub-picture, the sub-picture ID of the sub-picture on which it is dependent.

In some embodiments, the video parameter set further provides, for each sub-picture that is not indicated to be dependent on another sub-picture, a flag indicating whether the sub-picture corresponds to another sub-picture.

In some embodiments, the video parameter set further indicates, for each sub-picture that is indicated to correspond to another sub-picture, the sub-picture ID of the corresponding sub-picture.

In some embodiments, a video decoding method comprises: receiving an input bitstream comprising a plurality of sub-pictures, each sub-picture having a respective sub-picture ID; receiving a parameter set identifying a plurality of sub-picture groups, each group having an index; receiving a parameter set identifying, for each of a plurality of regions of an output frame, an index of a sub-picture group corresponding to the respective region; for each of the regions, decoding at least one of the sub-pictures in the sub-picture group corresponding to the region; and composing an output frame from the decoded sub-pictures.

In some embodiments, a media decoding method includes: receiving a bitstream comprising a plurality of layers and sub-layers, each sub-layer having a respective sub-layer ID; receiving a media parameter set, the media parameter set indicating, for each of a plurality of layers, whether the layer is available in the bitstream; and decoding the bitstream according to the media parameter set.

In some embodiments, a media decoding method includes: receiving a bitstream comprising a plurality of layers and sub-layers, each sub-layer having a respective sub-layer ID; receiving a media parameter set, the media parameter set indicating, for each of a plurality of layers, whether the layer can be decoded and output independently; and decoding the bitstream according to the media parameter set.

In some embodiments, a media decoding method comprises: receiving a bitstream comprising a plurality of layers and sub-layers, each sub-layer having a respective sub-layer ID; receiving a media parameter set, the media parameter set indicating a media type for each of a plurality of layers; and decoding the bitstream according to the media parameter set.

In some embodiments, a media decoding method comprises: receiving a bitstream comprising a plurality of layers and sub-layers, each sub-layer having a respective sub-layer ID; receiving a media parameter set, the media parameter set indicating a plurality of output sets of sub-layers including at least one selected output set; and decoding the sub-layers in the selected output set.

In some embodiments, the media parameter set further indicates a media type for each of the output sets.

In some embodiments, the media parameter set further indicates a layer ID of each of the output sets.

In some embodiments, a bitstream extraction method includes: receiving a bitstream comprising a plurality of layers and sub-layers, each sub-layer having a respective sub-layer ID; receiving a sub-layer parameter set, the sub-layer parameter set indicating an entry byte length for each sub-layer; and extracting at least partial media representations according to the sub-layer parameter set.

In some embodiments, a system is provided comprising a processor and a non-transitory computer-readable medium storing instructions operative to perform any of the methods described herein.

In some embodiments, a non-transitory computer-readable storage medium is provided storing a video bitstream generated using any of the methods described herein.

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Inserting in the signalling syntax elements that enable the decoder or middle box to identify the profile, tier, and/or level of a sub-picture.

A bitstream or signal that includes one or more of the described syntax elements, or variations thereof.

A bitstream or signal that includes syntax conveying information generated according to any of the embodiments described.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, or other electronic device operative to decode syntax elements indicating the profile, tier, and/or level of a sub-picture according to any of the embodiments described.

A TV, set-top box, cell phone, tablet, or other electronic device operative to decode syntax elements indicating the profile, tier, and/or level of a sub-picture according to any of the embodiments described, and that displays (e.g. using a monitor, screen, or other type of display) a resulting image.

A TV, set-top box, cell phone, tablet, or other electronic device that selects (e.g. using a tuner) a channel to receive a signal including an encoded image and decodes syntax elements indicating the profile, tier, and/or level of a sub-picture according to any of the embodiments described.

A TV, set-top box, cell phone, tablet, or other electronic device that receives (e.g. using an antenna) a signal over the air that includes an encoded image and decodes syntax elements indicating the profile, tier, and/or level of a sub-picture according to any of the embodiments described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
encoding in a bitstream a video including at least one picture comprising a plurality of sub-pictures, at least one of the sub-pictures being a layered sub-picture encoded using a plurality of layers, each sub-picture having a respective level and each layer of the layered sub-picture having a respective level; and
signaling in the bitstream a data structure, wherein the data structure indicates the level of each of the plurality of respective sub-pictures, including the level of each respective layer of the layered sub-picture;

wherein the level indicates a predefined set of constraints on values of syntax elements of the respective sub-picture or the respective layer of the layered sub-picture.

2. The method of claim 1, further comprising signaling, for each of the sub-pictures, information indicating a tier for the respective sub-picture.

3. The method of claim 1, further comprising signaling, for each of the sub-pictures, information indicating a profile for the respective sub-picture.

4. The method of claim 1, wherein each of the sub-pictures is associated with a layer, and wherein each sub-picture within a layer is encoded independently from other sub-pictures in the same layer.

5. An apparatus comprising:

a processor configured to perform at least:

encoding in a bitstream a video comprising a plurality of sub-pictures, at least one of the sub-pictures being a layered sub-picture encoded using a plurality of layers, each sub-picture having a respective level and each layer of the layered sub-picture having a respective level; and signaling in the bitstream a data structure, wherein the data structure indicates the level of each of the plurality of respective sub-pictures, including the level of each respective layer of the layered sub-picture;

wherein the level indicates a predefined set of constraints on values of syntax elements of the respective sub-picture or the respective layer of the layered sub-picture.

6. The apparatus of claim 5, wherein each of the sub-pictures is associated with a layer, and wherein each sub-picture within a layer is encoded independently from other sub-pictures in the same layer.

7. The apparatus of claim 5, wherein the processor is further configured to signal at least one output sub-picture set in the bitstream, wherein the output sub-picture set identifies at least a subset of the plurality of sub-pictures and includes the level for each of the sub-pictures in the subset.

8. The apparatus of claim 5, wherein the processor is further configured to signal at least one output sub-picture set in the bitstream, wherein the output sub-picture set identifies at least a subset of the plurality of sub-pictures and includes position offset information for each of the sub-pictures in the subset.

9. A method comprising:

decoding from a bitstream a video including at least one picture comprising a plurality of sub-pictures, at least one of the sub-pictures being a layered sub-picture encoded using a plurality of layers, each sub-picture having a respective level and each layer of the layered sub-picture having a respective level; and decoding from the bitstream a data structure, wherein the data structure indicates the level of each of the plurality of respective sub-pictures, including the level of each respective layer of the layered sub-picture;

wherein the level indicates a predefined set of constraints on values of syntax elements of the respective sub-picture or the respective layer of the layered sub-picture.

10. The method of claim 9, further comprising selecting an output sub-picture set of the sub-pictures based at least in part on the level, wherein decoding the video comprises decoding the selected output sub-picture set.

11. The method of claim 9, wherein each of the sub-pictures is associated with a layer, and wherein at least one sub-picture within a layer is decoded independently from other sub-pictures in the same layer.

12. The method of claim 9, further comprising composing at least one output frame from the decoded plurality of sub-pictures.

13. An apparatus comprising:

a processor configured to perform at least:

decoding from a bitstream a video including at least one picture comprising a plurality of sub-pictures, at least one of the sub-pictures being a layered sub-picture encoded using a plurality of layers, each sub-picture having a respective level and each layer of the layered sub-picture having a respective level; and decoding from the bitstream a data structure, wherein the data structure indicates the level of each of the plurality of respective sub-pictures, including the level of each respective layer of the layered sub-picture;

wherein the level indicates a predefined set of constraints on values of syntax elements of the respective sub-picture or the respective layer of the layered sub-picture.

14. The apparatus of claim 13, wherein the processor is further configured to select an output sub-picture set of the sub-pictures based at least in part on the level, and wherein the selected output sub-picture set is decoded.

15. The apparatus of claim 13, wherein each of the sub-pictures is associated with a layer, and wherein at least one sub-picture within a layer is decoded independently from other sub-pictures in the same layer.

16. The apparatus of claim 13, wherein the processor is further configured to compose at least one output frame from the decoded plurality of sub-pictures.

* * * * *